United States Patent
Smith et al.

(10) Patent No.: US 12,418,773 B2
(45) Date of Patent: Sep. 16, 2025

(54) DIGITAL TWIN FRAMEWORK FOR NEXT GENERATION NETWORKS

(71) Applicant: Intel Corporation, Santa Clara, CA (US)

(72) Inventors: Ned M. Smith, Beaverton, OR (US); S M Iftekharul Alam, Hillsboro, OR (US); Vesh Raj Sharma Banjade, Portland, OR (US); Satish Chandra Jha, Portland, OR (US); Liuyang Lily Yang, Portland, OR (US); Christian Maciocco, Portland, OR (US); Nageen Himayat, Fremont, CA (US); Arvind Merwaday, Beaverton, OR (US); Francesc Guim Bernat, Barcelona (ES); Kshitij Arun Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 17/556,738

(22) Filed: Dec. 20, 2021

(65) Prior Publication Data
US 2022/0191648 A1     Jun. 16, 2022

(51) Int. Cl.
| | |
|---|---|
| *H04W 4/029* | (2018.01) |
| *H04W 4/02* | (2018.01) |
| *H04W 12/69* | (2021.01) |
| *H04W 24/02* | (2009.01) |

(Continued)

(52) U.S. Cl.
CPC .......... *H04W 4/029* (2018.02); *H04W 4/023* (2013.01); *H04W 12/69* (2021.01); *H04W 24/02* (2013.01); *H04W 24/08* (2013.01); *H04W 48/16* (2013.01)

(58) Field of Classification Search
CPC ............ H04W 76/10; H04W 28/0967; H04W 36/305; H04W 4/023
See application file for complete search history.

(56) References Cited

U.S. PATENT DOCUMENTS

| | | | |
|---|---|---|---|
| 9,621,547 B2 * | 4/2017 | Sharaga | H04L 63/0869 |
| 10,193,858 B2 * | 1/2019 | Walker | G06F 21/00 |
| 10,404,692 B2 * | 9/2019 | Sharaga | H04L 63/08 |

(Continued)

FOREIGN PATENT DOCUMENTS

| | | |
|---|---|---|
| CN | 112118601 | 12/2020 |
| CN | 112382064 | 2/2021 |

(Continued)

OTHER PUBLICATIONS

English translation of CN1123820648 Jan. 2025 (Year: 2025).*

(Continued)

*Primary Examiner* — William D Cumming
(74) *Attorney, Agent, or Firm* — Schwegman Lundberg & Woessner, P.A.

(57) ABSTRACT

A digital twin model is generated for physical nodes of an edge network. The digital twin model includes a digital twin for a physical node of the physical nodes. An error is identified of the physical node or the digital twin for the physical node. The digital twin model is updated to halt communication with the physical node or the digital twin of the physical node. A path is created to another physical node or a digital twin of the another physical node in the digital twin model.

23 Claims, 25 Drawing Sheets

(51) Int. Cl.
*H04W 24/08* (2009.01)
*H04W 48/16* (2009.01)

(56) References Cited

U.S. PATENT DOCUMENTS

| | | | | |
|---|---|---|---|---|
| 11,483,233 | B2* | 10/2022 | Shariat | H04W 28/0967 |
| 11,841,882 | B2* | 12/2023 | Gawrys | G06F 16/587 |
| 12,120,838 | B2* | 10/2024 | Harvey | G06F 3/04847 |
| 12,156,051 | B2* | 11/2024 | Chenumolu | H04W 76/27 |
| 2004/0064457 | A1* | 4/2004 | Zimmer | G06F 21/575 |
| 2012/0113835 | A1* | 5/2012 | Alon | H04L 45/58 |
| | | | | 370/252 |
| 2012/0246470 | A1* | 9/2012 | Nicolson | G06F 21/57 |
| | | | | 713/158 |
| 2016/0095141 | A1* | 3/2016 | Ma | H04W 76/10 |
| | | | | 455/416 |
| 2016/0182499 | A1* | 6/2016 | Sharaga | G06F 21/82 |
| | | | | 713/156 |
| 2018/0048643 | A1* | 2/2018 | Sharaga | H04L 63/0892 |
| 2019/0158461 | A1* | 5/2019 | Walker | H04L 63/126 |
| 2021/0194796 | A1* | 6/2021 | Shariat | H04W 28/0967 |
| 2021/0287459 | A1* | 9/2021 | Cella | G07C 5/0808 |
| 2022/0191648 | A1* | 6/2022 | Smith | H04W 4/023 |
| 2022/0197231 | A1* | 6/2022 | Kim | G05B 23/0254 |
| 2023/0297040 | A1* | 9/2023 | Noh | G05B 13/027 |
| | | | | 700/1 |
| 2024/0112506 | A1* | 4/2024 | Smith | G07C 5/008 |
| 2024/0397655 | A1* | 11/2024 | Harvey | G05B 23/0264 |
| 2025/0024278 | A1* | 1/2025 | Tofighbakhsh | H04W 24/02 |
| 2025/0139910 | A1* | 5/2025 | Harvey | G06T 19/006 |

FOREIGN PATENT DOCUMENTS

| | | | |
|---|---|---|---|
| EP | 3451257 | 3/2019 | |
| GB | 2573554 | 11/2019 | |
| GB | 2573554 A * | 11/2019 | H04L 41/0654 |

OTHER PUBLICATIONS

"European Application Serial No. 22207896.6, Extended European Search Report mailed May 10, 2023", 10 pgs.

Huang, Huiyue, "Digital Twin-driven online anomaly detection for an automation system based on edge intelligence", Journal Of Manufacturing Systems, Society Of Manufacturing Engineers, Dearborn, MI, US vol. 59, (Feb. 26, 2021), 138-150.

Li, Fuxing, "Research on Digital Twin and Collaborative Cloud and Edge Computing Applied in Operations and Maintenance in Wind Turbines of Wind Power Farm", Proceedings of the 2nd International Conference on Green Energy, Environment and Sustainable Development (GEESD2021), (Dec. 3, 2021).

* cited by examiner

DIGITAL TWIN FRAMEWORK FOR NEXT GENERATION NETWORKS

TECHNICAL FIELD

Embodiments described herein generally relate to network node identity management and, in some embodiments, more specifically to a digital twin framework for next generation networks.

BACKGROUND

A digital twin (DT) is a virtual representation of elements and dynamics of a physical system/world. The virtual representation is used along with machine learning-based (ML-based) intelligent communication-compute systems and may enable fault-tolerance and trust. Example use cases for DT include smart cities, smart manufacturing, smart factories, and the like. However, for next generation networks (NGNs), achieving resiliency-by-design against fault-attack-failure-outage (FAFO) may be challenging.

BRIEF SUMMARY OF THE INVENTION

Not Applicable

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
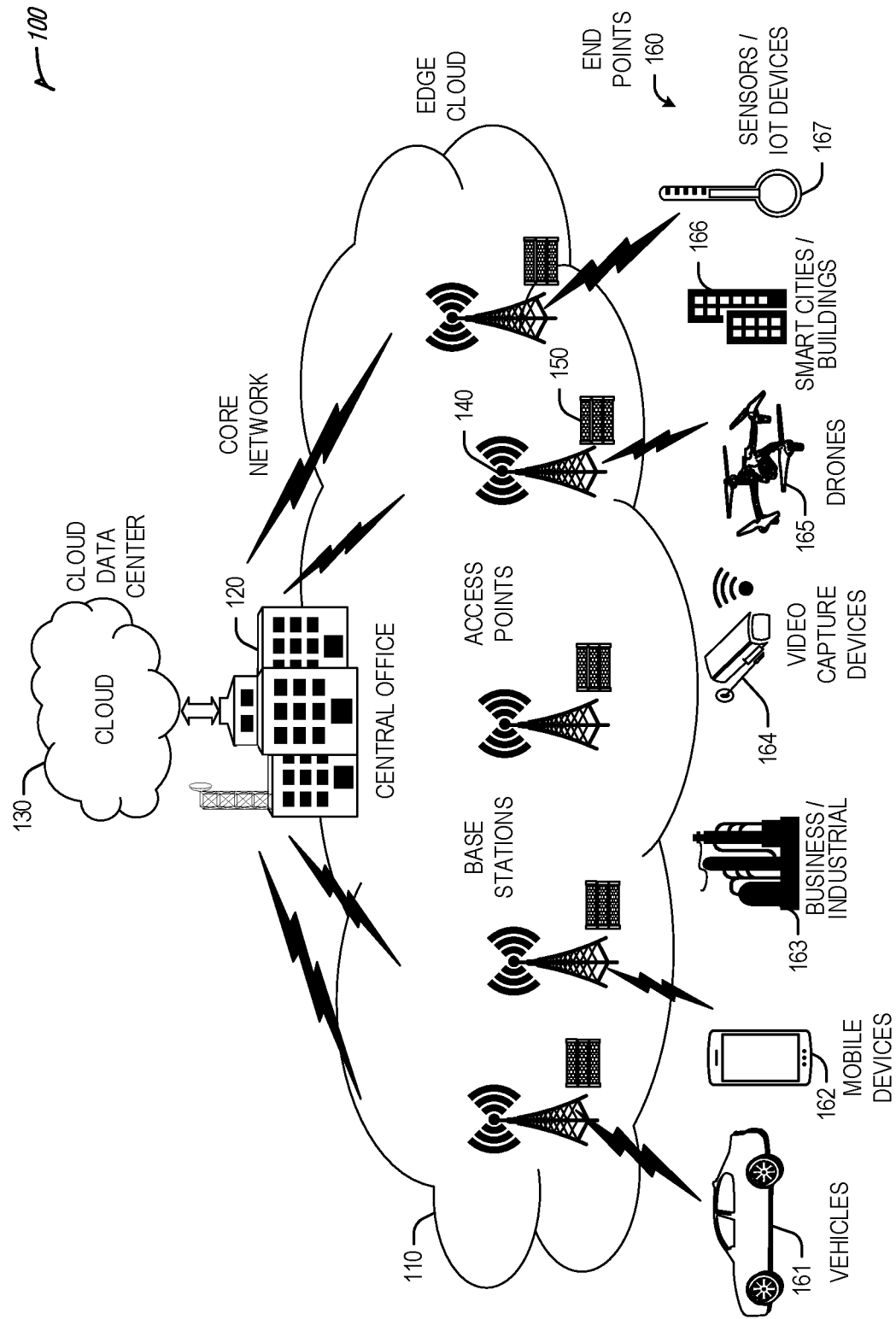
FIG. 1 illustrates an overview of an edge cloud configuration for edge computing.

The systems and techniques discussed herein create a DT framework for inherently introducing resiliency-by-design for increasing protection from FAFO events in next generation networks (NGNs). The systems and techniques discussed herein enable detection and resistance to fault-attack-failure-outage (FAFO) events for next generation resilient communications/compute systems with trust to handle FAFO events via networks offering digital twin model-based computation and analytics services at the edge/cloud that use a common management and control context. Resiliency-bydesign principles are formulated into disparate digital twins may become unwieldy as the number of redundant DTs increases.

Digital Twins (DTs) may be used as an approach for maintenance and scalable intelligent analytics of workloads in an international mobile telecommunications (IMT) network characterized by hybrid distributed/centralized architecture for reliable operations. The limitations of classical blockchain for decentralized data management in DT must be overcome. There may be a large amount of data, collected from a physical product (PP) via sensors, that is provided to a virtual product (VP) or a virtual network function (VNF) providing telemetry data that may act as a DT of the PP or VNF. As used herein, PP means either a PP or a VNF.

Advanced simulations and artificial intelligence (AI)/machine learning (ML) may allow VPs to generate utilities that may be used to optimize product performance and boost efficiency of the production system. When a PP (e.g., network VNFs, etc.) is optimized, the VP is synchronized with the new version of the PP. Thus, new data used for updating the VP may be prone to failures.

There are several problems that arise when building resilient DT solutions. In an example, maintaining a digital twin (DT) in the cloud (e.g., centralized, etc.) creates a single point of fault/failure. Alternatively, a DT at the fog (e.g., completely distributed, etc.) creates a consistency problem where synchronizing and aligning a DT state over DT clusters may not be guaranteed and/or creates added latency. Lack of synchronization among DTs and DT data sets leads to security and reliability (e.g., management, etc.) challenges. For scalable intelligent analytics, distributed-only or centralized-only approaches for training and operation of DL models with full-gradient sharing based federated learning (FL) exposes data to fault/failure/attacks as well as reliability/delay (e.g., due to larger packet sizes that leads to a straggler issue, etc.) where training/inference may fail.

In another example, sensor-data management/trust issues may arise in blockchain based consensus algorithms using edge servers or even distributed compute nodes (e.g., vehicles, etc.) as miners may have slower transaction speed which may be compounded with a larger number of nodes. Additionally, privacy sensitive leakage may occur as the community of distributed compute nodes are included in a DT cluster. It may be challenging for the network to manage decentralized datasets in a transparent and immutable manner.

While building redundant DTs is an intuitive concept to ensure resiliency, maintaining consistency and synchronization among PPs and multiple/redundant DTs is non-trivial in the presence of faulty sensors, security attacks, and network failures.

There are many possible failure points in a DT network. For example, redundant DTs within a local server designed to achieve resiliency may be negated by FAFO events within the local server due to local resource failure (e.g., a failure of shared memory, compute, etc.) Redundancy in server A, in the form of multiple local servers, may work until an FAFO event brings Server A down. Redundancy in a base station rack with multiple servers may work until an FAFO event affects the base station or brings connection equipment down. Redundant DTs that span an edge network may have DTs in the core network. DTs in the core edge network may work unless FAFO events occur in the radio access network (RAN) or other connection path that isolates the remote DT or there is an FAFO affecting a core data center. Hence, neither centralized nor decentralized DT architectures sufficiently protect against FAFO events. The systems and techniques provide a solution to protect against FAFO events to instill resiliency along the entire spectrum of communication-computing-data-devices while building a DT framework.

A centralized DT management approach may be used which has more computational power and storage but has higher latency. Distributed architectures may suffer from higher management complexity. To address the issue, hybrid DT management is employed with local/on-demand response handled by a far-edge (e.g., accidents reporting) while periodic responses (e.g., vehicle traffic control) are handled by a near-edge/cloud (e.g., with periodic data collection and reporting by an edge computing node) which loops back the updated objects/models with an edge-based twin that respects tradeoffs between the two handlers in terms of computational power, storage capacity, latency, and reliability. A Byzantine-generals based consensus protocol may be used for handling sensor-data management/trust where M of N threshold logic is used to get a consensus view of sensors/DTs where there are multiple-twins (e.g., for a cluster of DTs, etc.). M of N redundancy enables added resiliency. An execution checkpointing log may be leveraged to synchronize one or multiple DTs against a primary environment (e.g., VNF, container, etc.) that performs a workload, function, or operation. Hybrid centralized-distributed DT management balances a trade-off among computational power, storage capacity, latency, and reliability and enables highly available DT operation in the presence of failed or compromised sensors.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
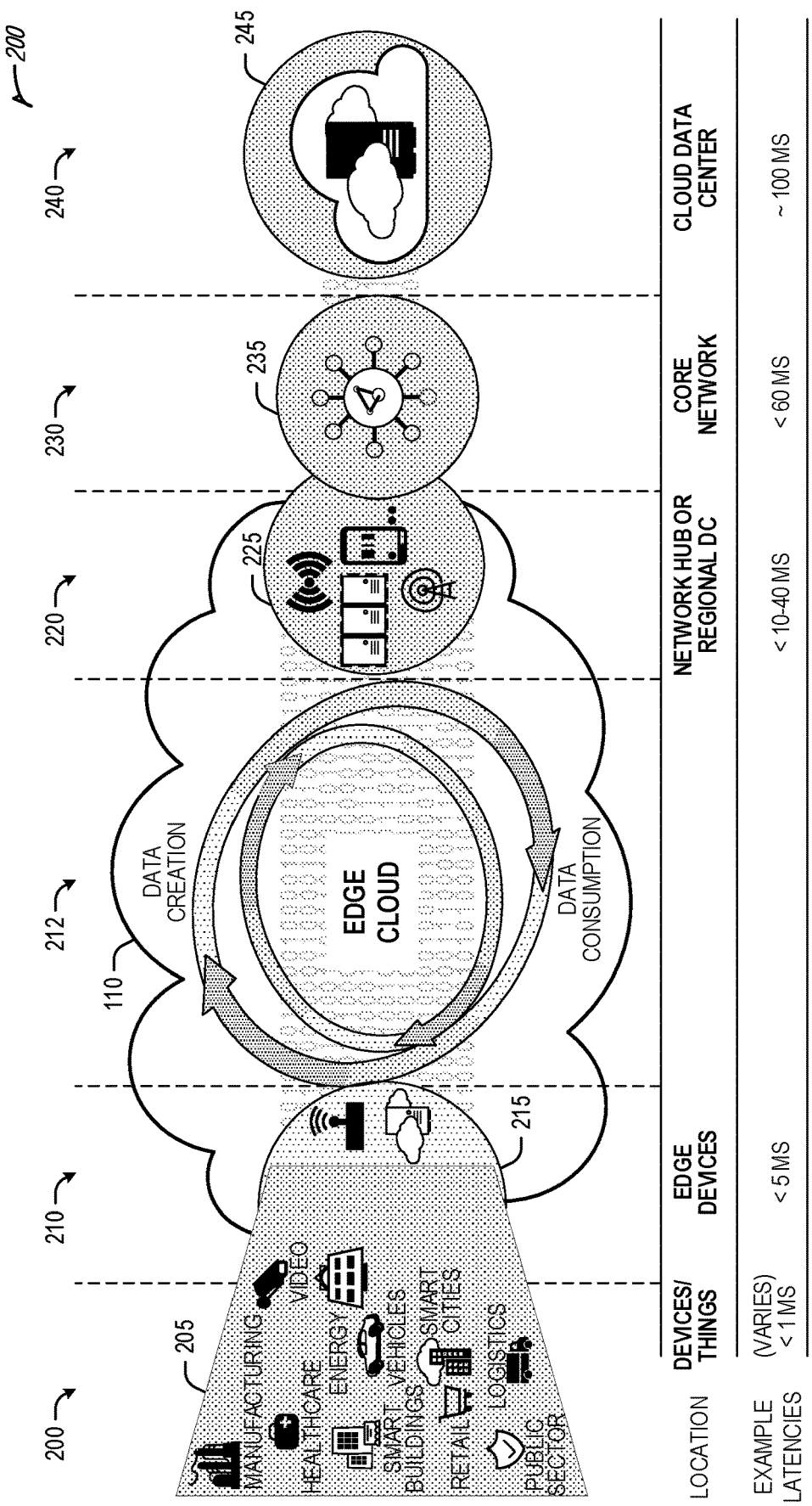
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
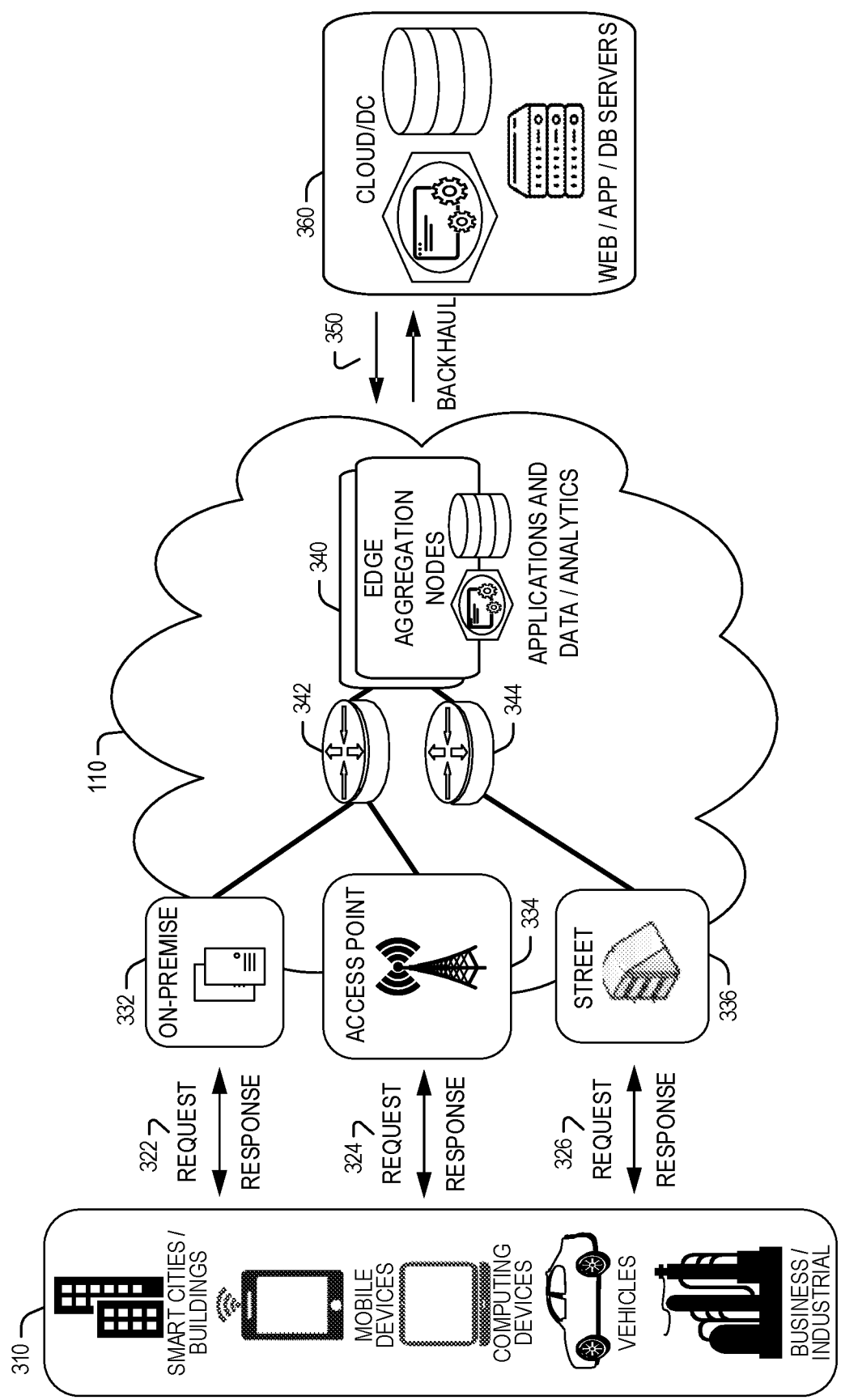
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
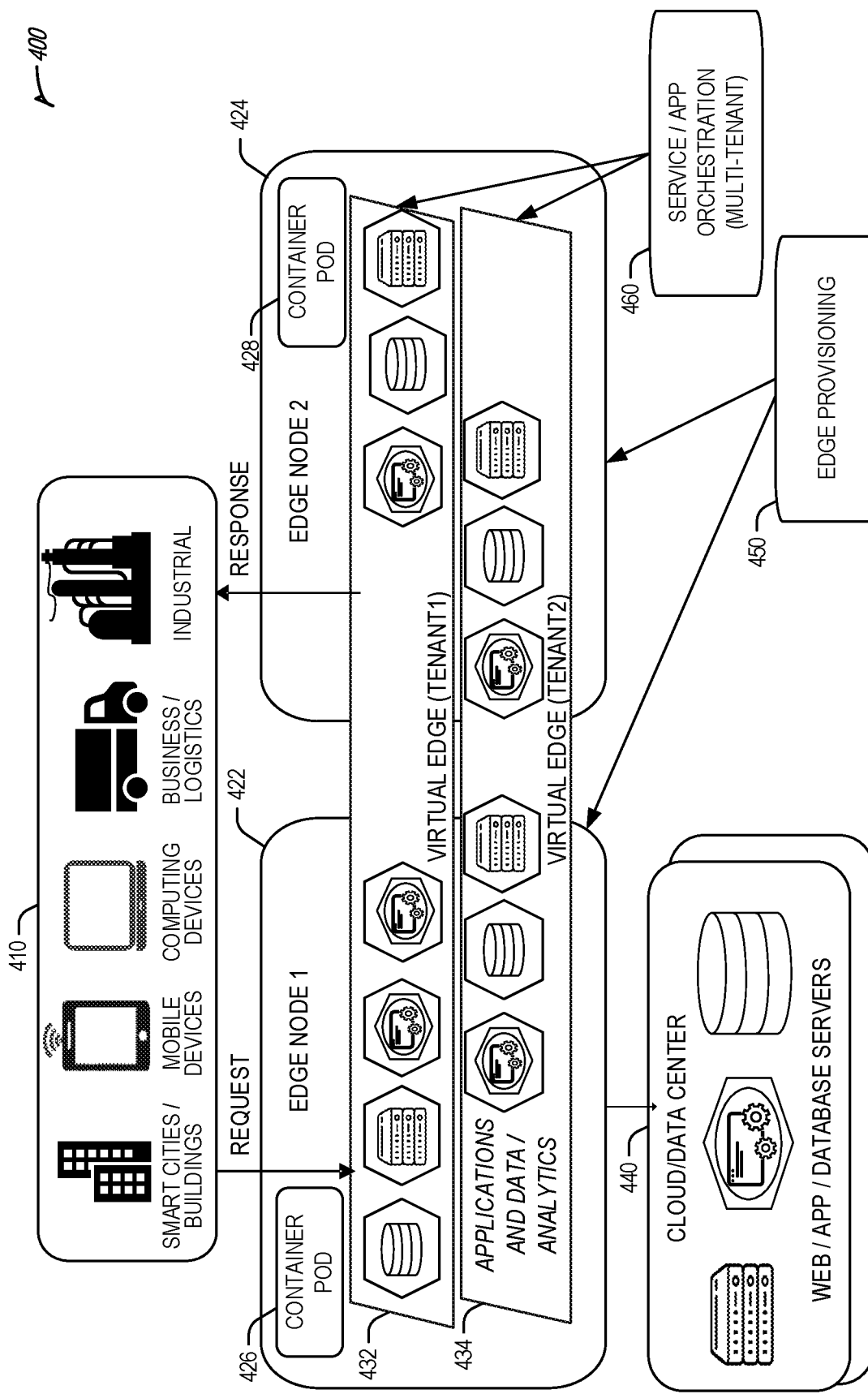
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
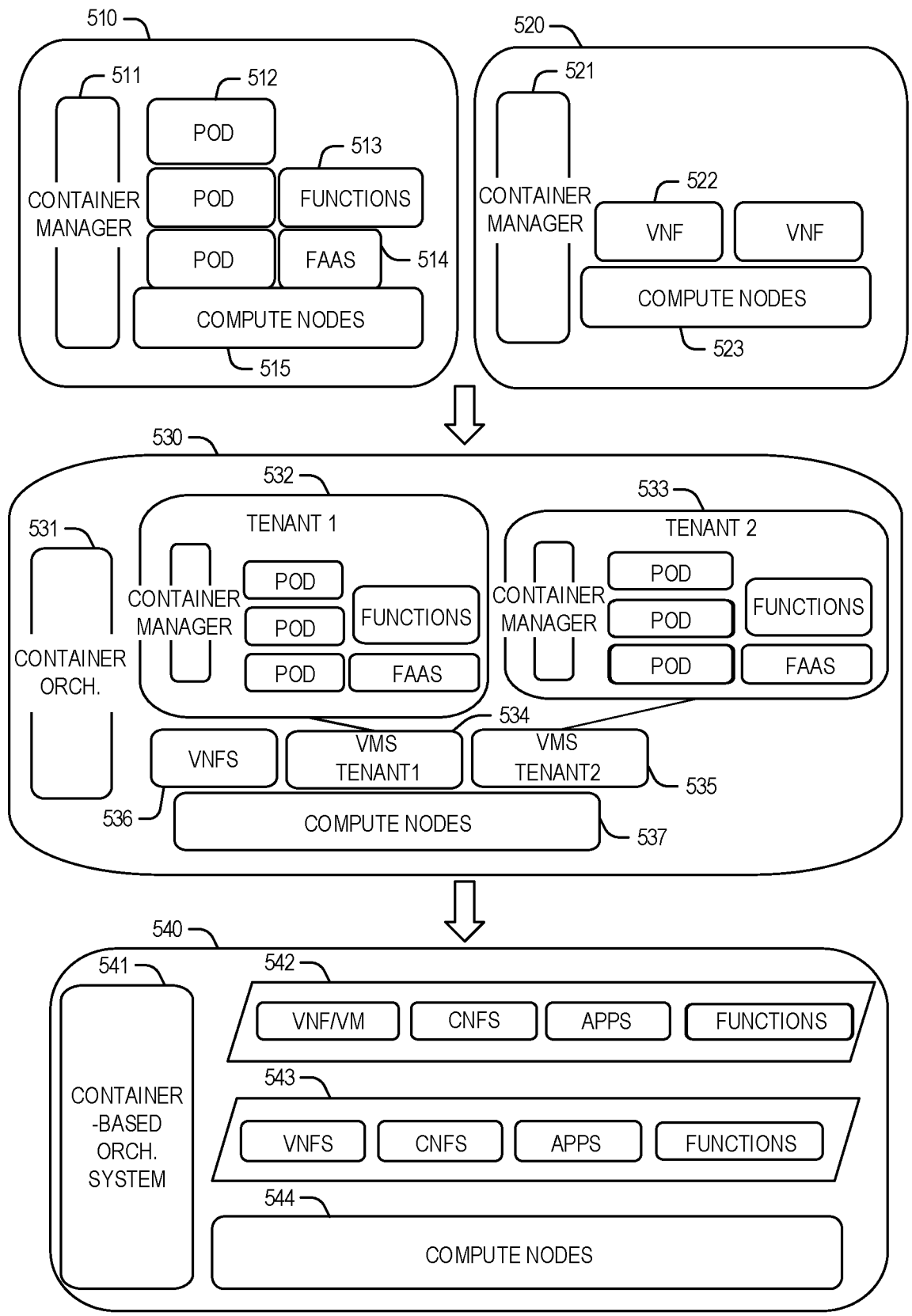
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
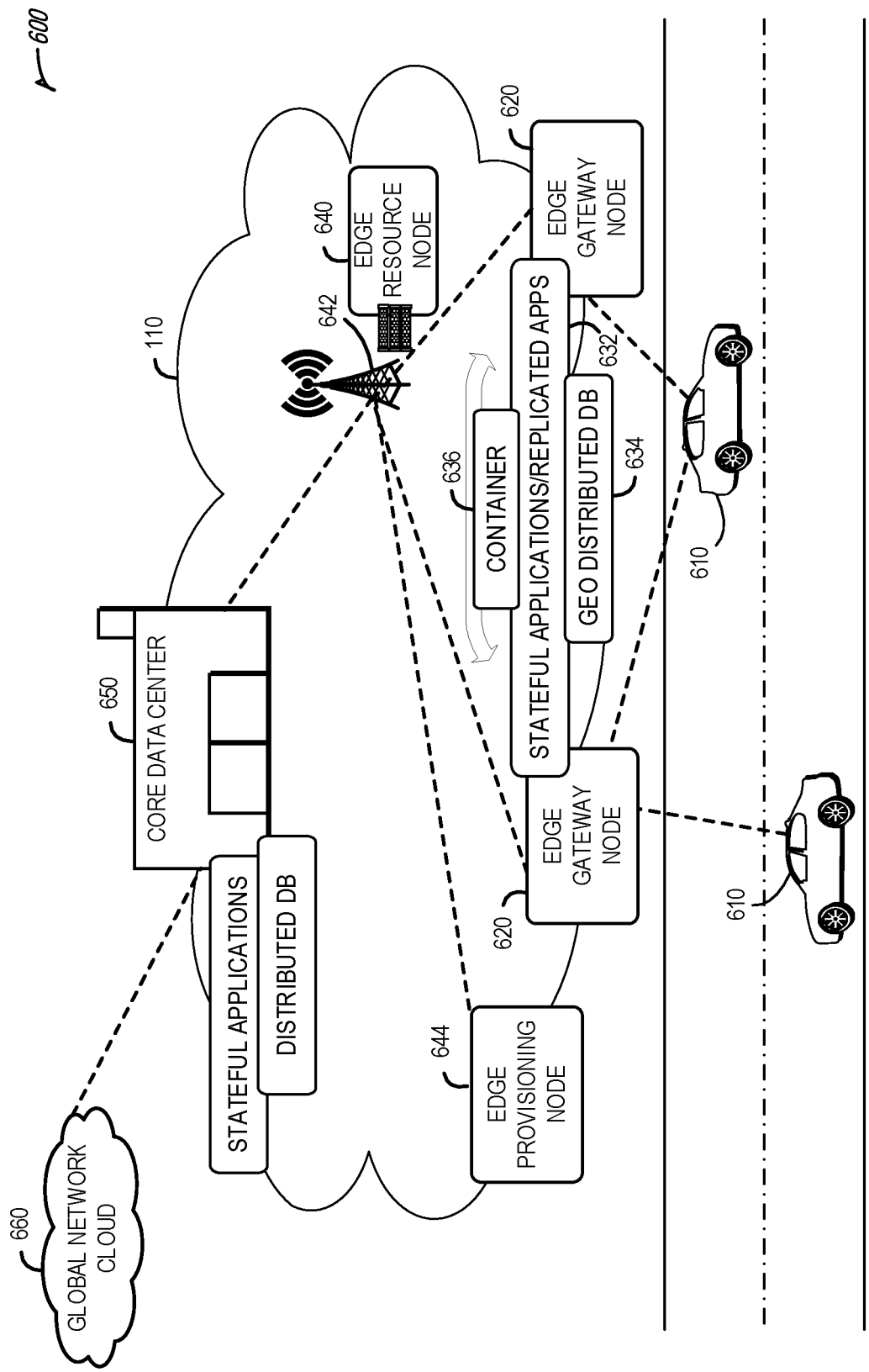
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
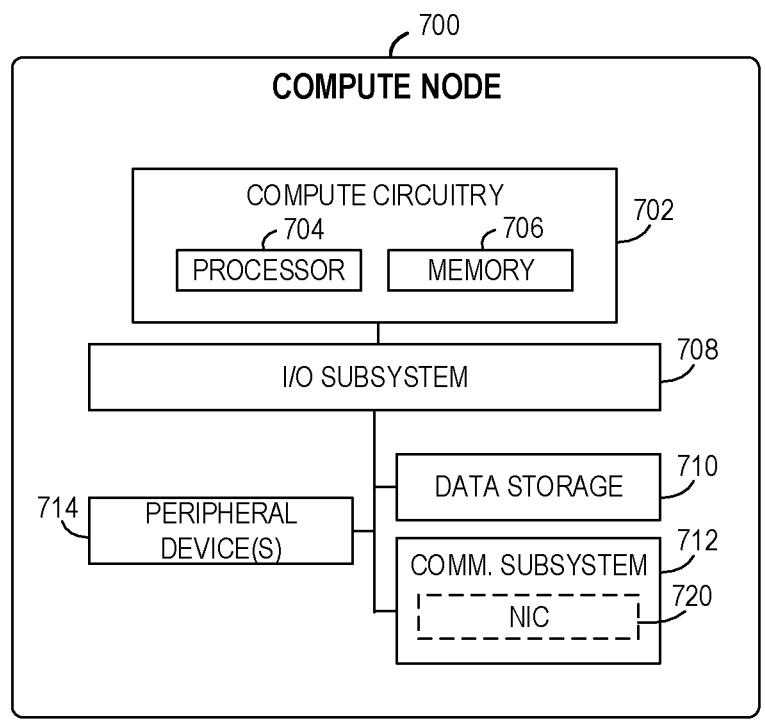
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, short-range wireless communication (e.g., Bluetooth®), Bluetooth® Low Energy, a IOT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
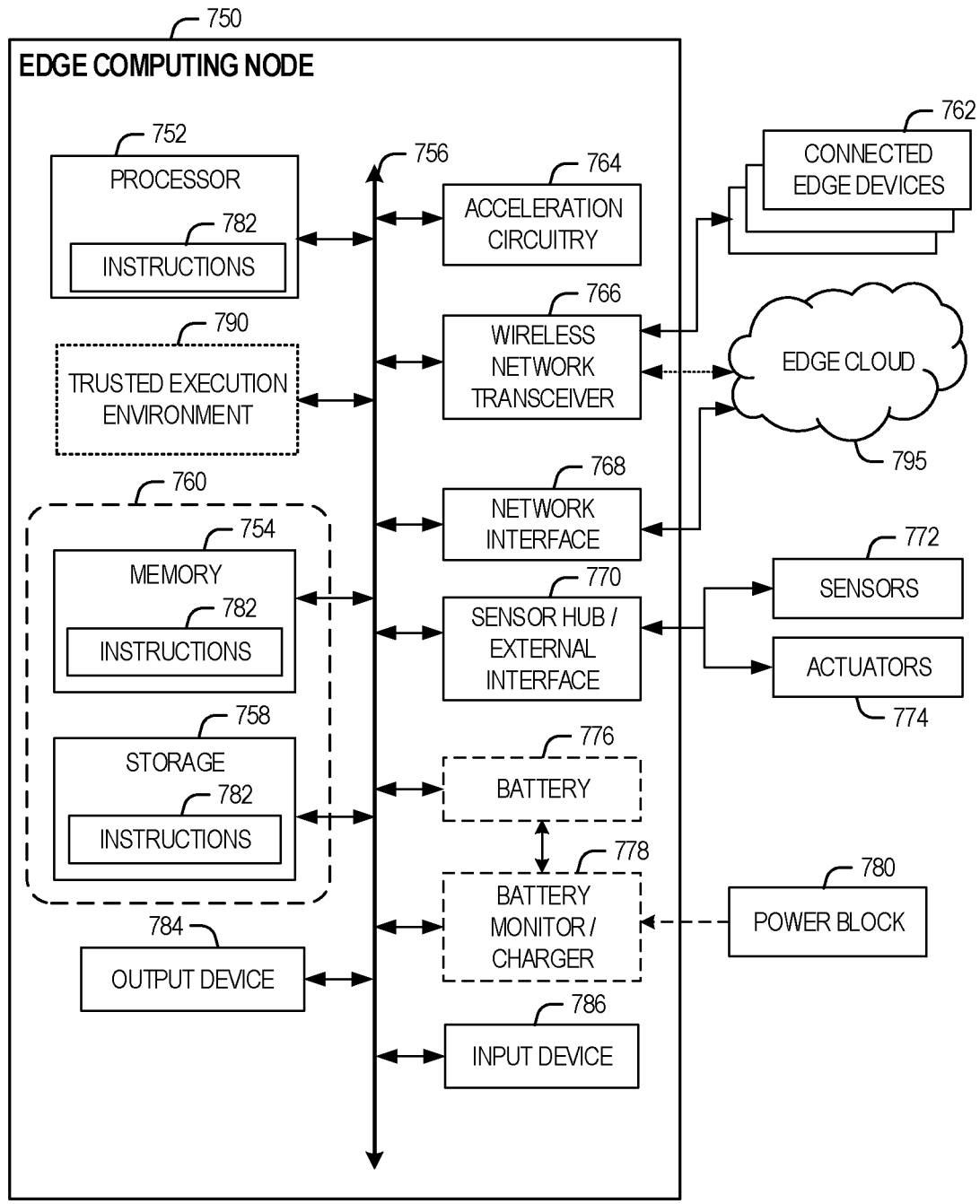
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, Calif. As an example, the processor 752 may include an Intel® Architecture Core™ based CPU processor, such as a Quark™, an Atom™, an i3, an i5, an i7, an i9, or an MCU-class processor, or another such processor available from Intel®. However, any number of other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth® Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies.

Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, Calif., among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 7C:
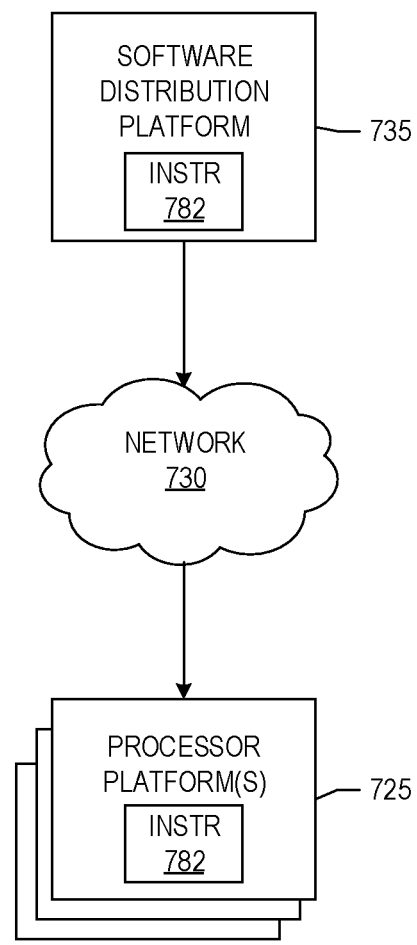
FIG. 7C illustrates an example software distribution platform to distribute software to one or more devices.

FIG. 7C illustrates an example software distribution platform 735 to distribute software, such as the example computer readable instructions 782 of FIG. 7B, to one or more devices, such as example processor platform(s) 735 and/or example connected Edge devices 310 of FIG. 3. The example software distribution platform 735 may be implemented by any computer server, data facility, cloud service, etc., capable of storing and transmitting software to other computing devices (e.g., third parties, the example connected Edge devices 310 of FIG. 3). Example connected Edge devices may be customers, clients, managing devices (e.g., servers), third parties (e.g., customers of an entity owning and/or operating the software distribution platform 735). Example connected Edge devices may operate in commercial and/or home automation environments. In some examples, a third party is a developer, a seller, and/or a licensor of software such as the example computer readable instructions 782 of FIG. 7B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 7C, the software distribution platform 735 includes one or more servers and one or more storage devices. The storage devices store the computer readable instructions 782, which may correspond to the example computer readable instructions, as described above. The one or more servers of the example software distribution platform 735 are in communication with a network 730, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 782 from the software distribution platform 735. For example, the software, which may correspond to the example computer readable instructions, may be downloaded to the example processor platform(s) 735 (e.g., example connected Edge devices), which is/are to execute the computer readable instructions 782 to implement the digital twin framework. In some examples, one or more servers of the software distribution platform 735 are communicatively connected to one or more security domains and/or security devices through which requests and transmissions of the example computer readable instructions 782 must pass. In some examples, one or more servers of the software distribution platform 735 periodically offer, transmit, and/or force updates to the software (e.g., the example computer readable instructions 782 of FIG. 7B) to ensure improvements, patches, updates, etc., are distributed and applied to the software at the end user devices.

In the illustrated example of FIG. 7C, the computer readable instructions 782 are stored on storage devices of the software distribution platform 735 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 782 stored in the software distribution platform 735 are in a first format when transmitted to the example processor platform(s) 735. In some examples, the first format is an executable binary in which particular types of the processor platform(s) 735 can execute. However, in some examples, the first format is uncompiled code that requires one or more preparation tasks to transform the first format to a second format to enable execution on the example processor platform(s) 735. For instance, the receiving processor platform(s) 735 may need to compile the computer readable instructions 782 in the first format to generate executable code in a second format that is capable of being executed on the processor platform(s) 735. In still other examples, the first format is interpreted code that, upon reaching the processor platform(s) 735, is interpreted by an interpreter to facilitate execution of instructions.

Figure 8:
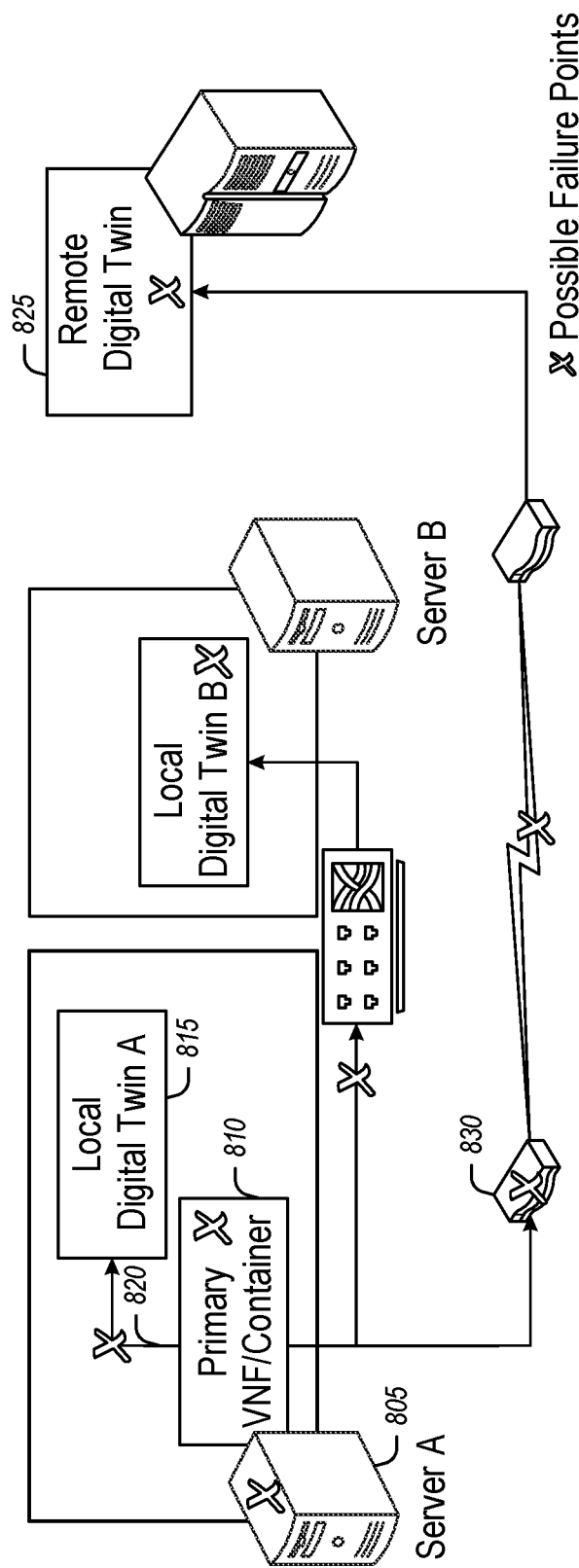
FIG. 8 is a block diagram of an example of failure points in a digital twin architecture.

FIG. 8 is a block diagram of an example 800 of failure points in a digital twin architecture. As shown in FIG. 8, several possible failure points are present in network utilizing digital twins. For example, a server 805, primary VNF/container 810, local digital twin 815, a communication link 820 between the primary VNF/container and the local digital twin, a remote digital twin 825, and a router or other equipment 830 may fail and compromise the digital twin architecture.

Figure 9:
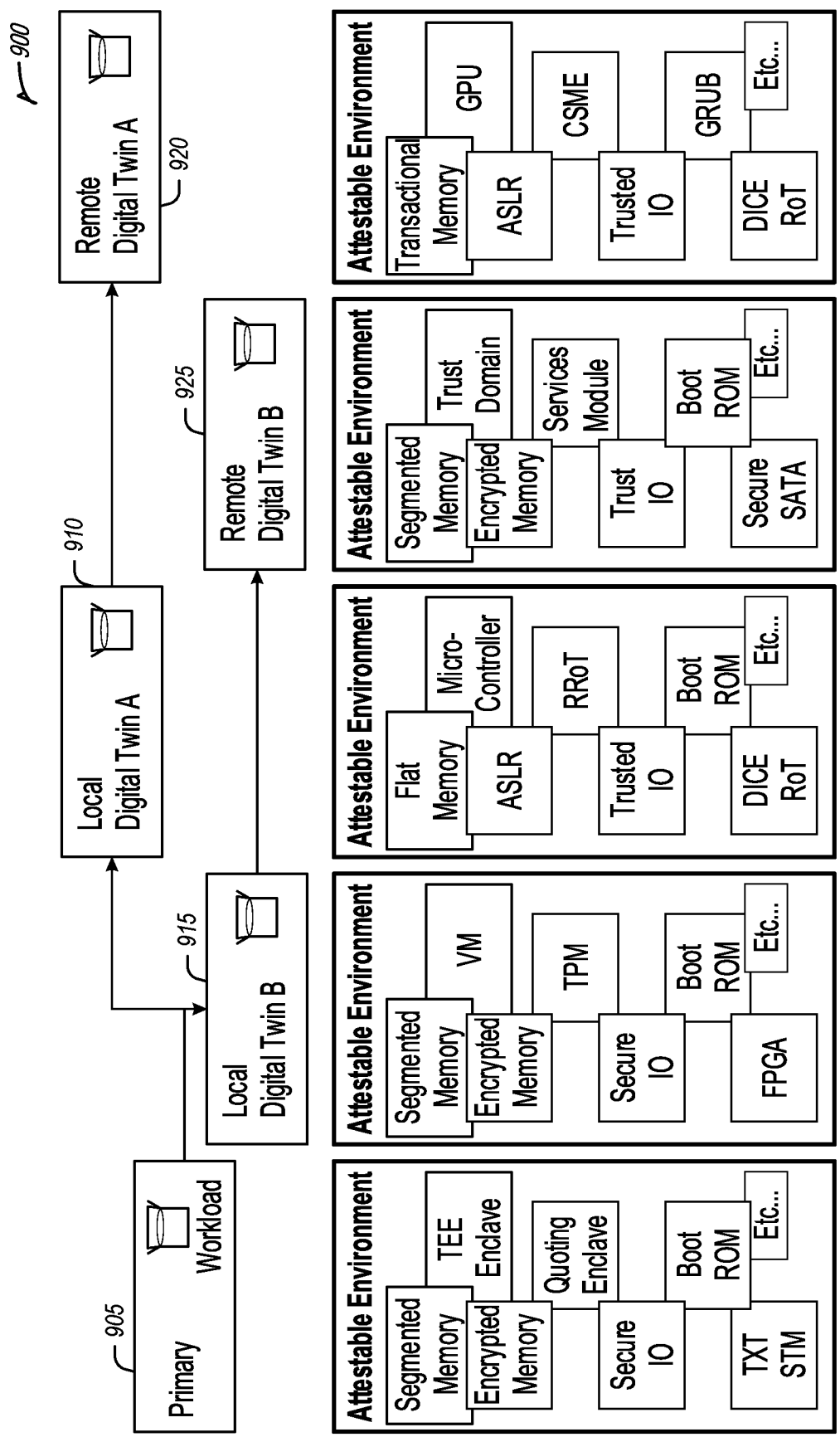
FIG. 9 is a block diagram of an example of a digital twin cluster where the digital twin hosting environments may differ from the environment hosting the primary workload.

FIG. 9 is a block diagram of an example of a digital twin cluster 900 where the digital twin hosting environments may differ from the environment hosting the primary workload 905. A single workload hosting environment may perform attestation of the target environment that is compared to a policy that accepts/denies the environment as suitable for the workload (WL) and WL data. In a DT deployment, there may be multiple DTs (e.g., local DT A 910, local DT B 915, remote DT A 920, and remote DT B 925) that represent a physical node and are strategically located around the network to hedge against the various possible FAFO events.

The hosting environments for the local DT A 910, the local DT B 915, the remote DT A 920, and the remote DT B 925 could differ (e.g., have different configuration, varied attestable components, etc.) from those used by the primary workload 905. The weakest environment in the collection defines the minimum security, protection, and trustworthiness for the collection. For the workload to be protected consistently across all instances, attestation equivalence describes a range of techniques and technologies that may be used to complete attestation for the digital twins.

Figure 10:
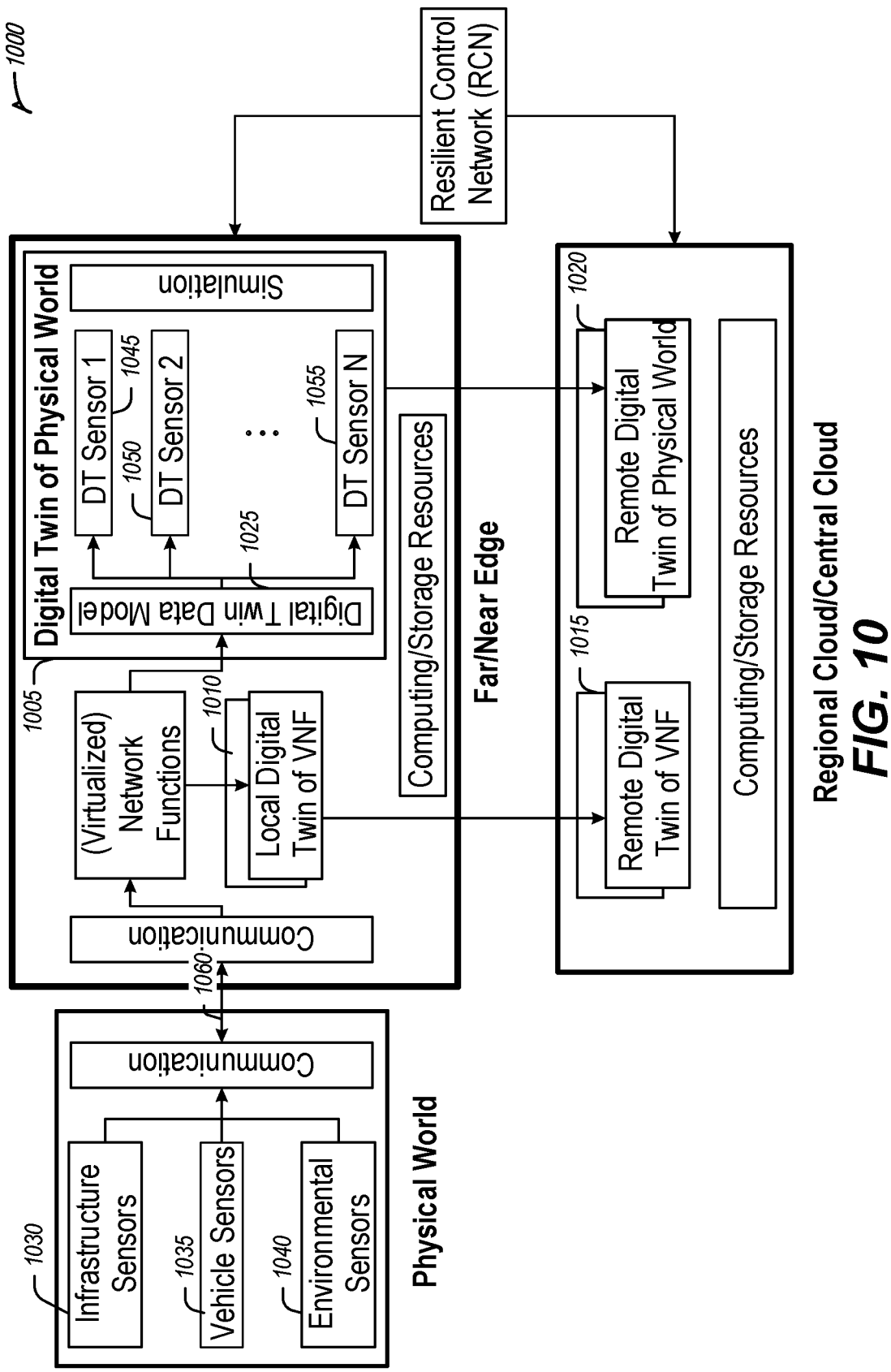
FIG. 10 is a block diagram of a hybrid centralized-distributed framework for resilient digital twin management where redundant (local/remote) digital twins may span across an edge-core-cloud for a digital twin framework for next generation networks, according to an embodiment.

FIG. 10 is a block diagram of a hybrid centralized-distributed framework 1000 for resilient digital twin management where redundant (local/remote) digital twins may span across an edge-core-cloud for a digital twin framework for next generation networks, according to an embodiment. Digital twin for resilient orchestration and management of heterogeneous edge services provides resiliency against faults, attacks, outages, or misbehavior of users in networks offering digital twin model-based computation and analytics services at the edge/cloud. The systems and techniques discussed herein may apply to real-time, periodic, and on-demand digital twin use cases. Several strategies are applied for achieving increased resiliency in mobile edge networks using a combination of local and remote digital twins.

There may be a large amount of data, collected from the physical product (PP) via sensors, that is provided to a function (e.g., using an AI/ML algorithm such as a convolutional neural network, etc.) to build a digital representation of the physical world. The digital representation may contain a single digital twin that models the entire physical world (e.g., digital twin of the physical world 1005) or multiple digital twin objects that model individual objects/sensors (e.g., local digital twin of the VNF 1010, remote digital twin of the VNF 1015, remote digital twin of the physical world 1020, etc.) or a subset of objects/sensors in the physical world. The process of building a reliable digital representation of the world involves communication/interaction with the sensors/physical entities, quality data collection, utilization of computing resources at an edge/cloud computing node for AI/ML-based DT object modeling (e.g., using a digital twin data model 1025), and selection of a set of physical sensors (e.g., infrastructure sensors 1030, vehicle sensors 1035, and environmental sensors 1040) or DT objects (e.g., DT sensors 1045, 1050, and 1055) when an FAFO event impacts sensors or a communication network 1060. The resiliency-by-design approach builds resiliency along all components of the process with reduced communication/computation/energy overhead and cost.

Figure 11:
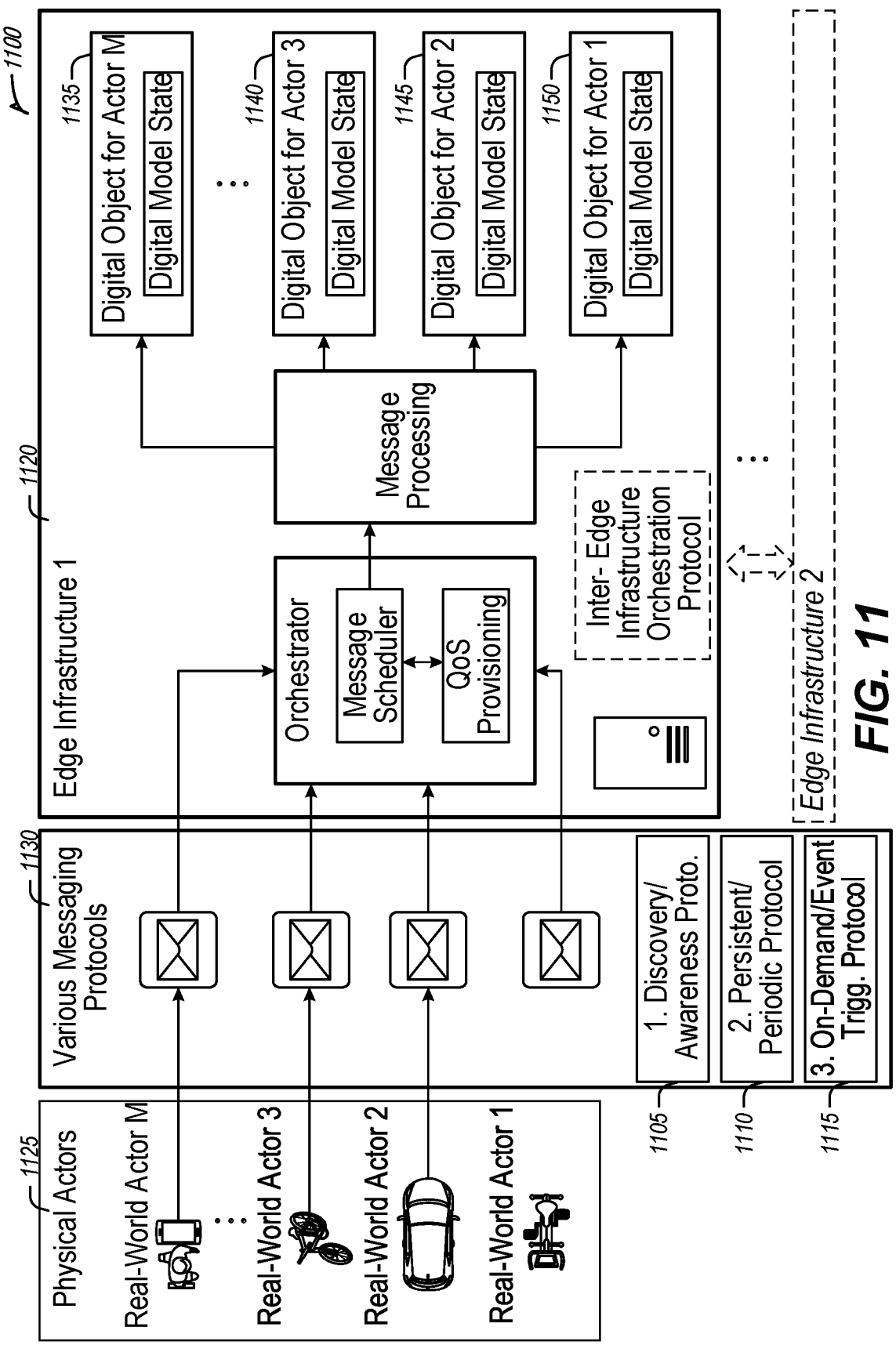
FIG. 11 is a block diagram of an example of digital twin management with local/on-demand response handled by an edge computing node for a digital twin framework for next generation networks, according to an embodiment.

FIG. 11 is a block diagram of an example of digital twin management 1100 with local/on-demand response handled by an edge computing node 1105 for a digital twin framework for next generation networks, according to an embodiment. A careful inclusion of various procedures/steps in a messaging protocol 1130 are devised to acquire real-world physical objects/actors/nodes 1125 and related data and create a digital representation of the physical objects (e.g., digital objects 1135, 1140, 1145, and 1150) in an edge infrastructure 1120.

A discovery/awareness protocol 1105 is responsible for initial/mutual discovery of the edge infrastructure 1120 by the real-world objects/actors/nodes 1125 and vice versa. For instance, a wireless broadcast messaging-based handshake protocol may be initiated and may be used to discover the real-world actors 1125 by the edge infrastructure 1120 assuming both real-world actors/nodes. The DT of a physical object/actor/node 1125 is created/instantiated at the edge infrastructure 1120.

A persistent or periodic protocol 1110 may persistently or periodically run a message exchange protocol for regular/periodic updates of the DT model for all objects/actors/nodes 1125 at the edge infrastructure 1125 when the physical node has been discovered by discovery/awareness protocol 1105. Example updates include the digital model update via periodic reporting of position, features, trajectory (in case of vehicles or moving persons as physical objects). If a resource on a far-edge becomes scarce, the latency-insensitive responsibility for the persistent or periodic protocol 1110 may be moved to near-edge or cloud as well.

An on-demand or event triggered protocol 1115 may enable event-based triggering of the DT model update. For instance, in an industrial DT setting, if any of the factory robots and/or humans malfunctions, the malfunction may be treated in real-time to avoid injuries or accidents and processes event-triggered actions in near real-time.

Communication overhead for friendly data/message exchange between infrastructure and vehicles may be used to provide each actor/vehicle with a customized individual service message (e.g., an individual digital twin nearby) versus a common digital twin for nearby vehicles to increase performance for larger messages or latency sensitive messages. Providing each actor/vehicle with a customized individual service message (e.g., an individual digital twin nearby) may incur communication overhead, especially for larger and/or latency-sensitive messages, compared to the cases of a common digital twin for nearby vehicles. Transmitting a group digital twin message for a small group of vehicles on a road saves bandwidth. Saved bandwidth may enable transmission of more copies of group digital twin messages with the same overhead increasing reliability in the case of group messages.

Redundant communication paths to the edge may provide continuous data flow if one path fails. Differentiated security properties may be applied to various paths based on reputation ranking with a provision for fallback to a baseline security path in case of partial path exhaustions. A wireless path may be used to send at least baseline sensing data. Local coordination among sensors may be useful to reduce backhaul data locally. For example, a wireless medium may be shared among sensors.

Paths are established to other Edge DT nodes in case a current edge node is compromised and informs other DT nodes as a FAFO early warning providing autonomous detection of a security compromise and triggering a data exchange to a new edge. A control plane path that includes control plane communications links may facilitate early warning signaling. The more robust the control plane in terms of dedicated physical resources the better edge attacks and other FAFO events may be conveyed to other edge nodes or sensors—even if the data plane is compromised.

Compute resiliency depends on resiliency of compute resources and compute functionalities at edge computing node, communication between sensors and the edge computing node, communication between the edge computing node and an actor/vehicle. The sensor, road-actor/user/vehicle, or edge computing node (or an edge computing node capability) may be compromised. Thus, compute redundancy or standby alternate compute is maintained to be used when needed. More physical resources may be implemented at the edge computing node or resource coordination and sharing may be facilitated among proximate edge computing nodes or edge networks.

Computational requirements may vary based on traffic situations, time of day (e.g., night may not need frequent or reduced sensor data analysis), service needs of vehicles (e.g., in sparse traffic, digital twin data may not need to be exchanged). Unused computation resources may be kept ready for time sensitive event triggered analytics (e.g., an accident, etc.). Local coordination improves autonomy, hides complexity, and minimizes backhaul resource use while increasing power consumption at the locality. A balance may be determined between the level of autonomy and the power consumption of a given autonomy level.

If individual sensors provide poor data or fail, the overall system must still be able to provide reliable information. The overall system decides autonomously which systems are used and which systems (e.g., those experiencing poor quality, etc.) are left out of calculations. A sensor may perform preliminary analytics to determine a quality of data before transmitting to the edge. Preliminary analytics may be performed by dynamically forming a coalition of decentralized consensus. Each camera maintains keys that are derived from sensor analytics software. If the software changes, then the key that attests sensor readings also changes. The keys maintain logs of key operations and re-key events (tied to software changes) as a history that can be inspected for inaccurate or duplicitous behavior. Peer edge computing nodes may evaluate key logs for suspicious key operations. A consensus of key log evaluations may result in a node (e.g., camera, etc.) being banned from the coalition to isolate/exclude nodes that are maliciously or errantly misbehaving. The coalition may perform other operations besides evaluating key operations. The coalition may evaluate quality of service (QoS) metrics as well. If the coalition believes operations may be achieved at a particular QoS and one node is consistently below the minimum threshold, that node may be removed from the coalition (because it cannot satisfy minimum QoS requirements).

Detecting which sensor is not producing high quality data may be challenging. In a mobile vehicle-to-everything (V2X) network, vehicles on a road may help identify a sensor by onboarding the sensor and cross-checking a digital twin of the sensor as defined by the digital twin infrastructure. A feedback message may be used by road actors sent to edge computing nodes that help identify low performing sensors. Other sensors may be reconfigured to load balance a field of view (FoV) of a low performing sensor to enhance resiliency of a digital twin. If a sensor is compromised, edge computing nodes may coordinate with other sensors to keep a service operational. Some sensors have FoV that may be adjusted to capture a compromised sensor FoV.

Another challenge for resiliency/reliability is high quality zero-day detection. Compromise may not be readily detectable. Compromises may not be malicious (e.g., may not cause harm, damage, etc.) but accidental exfiltration of what a camera detects may be as significant as a malicious exfiltration. A compromised sensor may be a privacy concern or a business concern where a loss of information translates to loss of value. Beyond that, the user experience for 360 degree FoV is compelling. A multi-camera 360 degree FoV protocol may use connectionless communications to broadcast camera frames necessary to construct a 360 degree FoV locally (e.g., for each display device that monitors the broadcast, etc.).

In an example, trustworthiness of data is also assessed for the digital twins. Multiple transmissions of sensor data are allowed along redundant paths (with a few common nodes selected randomly) and network provenance (e.g., a signature of an entire forwarding path, etc.) is added as meta-data to the payload. At the edge, a reputation management framework is used to track reputation of sensors/devices/nodes over time based on data variances and network provenance differences. If an edge computing node receives two different data values along different paths, the set of nodes on the forwarding path where data consistency forks are listed as suspicious. After receiving several readings from the sensors, the list may be narrowed down to a few suspicious entities with high confidence. Data from a sensor may be filtered out if the reputation of that sensor goes below a certain threshold. The number of transmissions may be adaptive (e.g., may increase if certain areas need additional scrutiny based on its context, trust score, etc.). For example, assuming an attack (e.g., a ghost vehicle on the road, etc.) is detected in the physical world via a dedicated process integrated into the digital twin, the DT may analyze all possible actions from the attacker. For each possible action, the DT may launch parallel simulations to identify the consequences of the attack and recommend some conservative responses to the real-world entities as a way of minimizing the possible negative consequences from the attack (e.g., avoidance of killing a pedestrian, etc.).

For scalable intelligent analytics, distributed-only or centralized-only approaches for training and operation of DL models with full-gradient sharing based federated learning (FL) exposes data for fault/failure/attacks, reduces reliability, and increases delay (e.g., due to larger packet sizes, straggler issues, etc.) leading to training/inference failures. A sparsification-enabled federated learning (SFL) approach addresses these problems with FL, where the important values of a full gradient are sent to reduce communication overhead and subsequently reduce failure by reduction of packet sizes. A distributed-sparsification enabled FL (DSFL) for distributed aggregation results in failure-tolerant model updates. Furthermore, combining techniques like sketching, coding methods, and different ways of combining centralized and distributed processing in FL may protect against misaligned users.

A cryptographic identity of a digital twin is often tied to a hardware root of trust of a devices/environment. When hardware is replaced, the digital twin may be used during the replacement operations and therefore presents an identity that is the same as the primary but also has a secondary identity that distinguishes it from its twin. Therefore, digital twin devices may have both a unique identifier and a common identifier. The unique identifier allows each device to authenticate its unique identity for purposes of forensics, supply chain proof of custody, etc. The common identity allows the DT cluster to operate as a single entity from the perspective of other network nodes that interact with the DT. Each DT device may further have a class identifier that is common, not only to the DT instances, but also to a variety of nodes that are similarly configured having similar hardware and/or software characteristics. The class identifier may be used for attestation of the digital twin as a device of a particular type. The class identifier may be authenticated using a group credential such as an enhanced privacy identifier (EPID) key (e.g., Direct Anonymous Attestation—DAA), a shared asymmetric private key (e.g., Elliptic Curve Digital Signature Algorithm—ECDSA), or a shared symmetric key. When operating as a digital twin such as in a hot standby mode, if the primary endpoint fails the twin may take the workload. As part of the transition, a device class attestation may be performed to ensure the twin is authorized/trusted to perform device functions, but without requiring the peer to maintain access control lists for discrete/interchangeable parts. The common identifier may be used when a DT cluster authenticates its common identity. The unique identifier may be used when one of the twins in a DT cluster needs to be tracked for audit, forensic or manageability use cases.

For example, area scan cameras and radars may observe traffic on a highway from two overhead signs. The locally collected data is processed on-site. Objects are identified and anonymized. Fusion of the sensor data may create a digital twin in real time. Thus, digital twins may be created dynamically as new data entities are created. Existing large scale sensing frameworks do not use perception reported from actors/vehicles. Using perception from vehicles of actors may enhance a range of digital twin coverage. For example, a car behind a bigger truck may not be visible by the digital twin infrastructure, small animals may not be visible on the road which is important for a human driver/passenger to know to make certain driving decisions.

A camera (e.g., on-site processors, etc.) is trusted by vehicle drivers to protect anonymity. The cameras expose an interface for collecting attestation reports that prove software and hardware are applying reasonable anonymization techniques. These devices may be supplied by governments or private companies that do not require institutional trust to claim anonymization properties. A digital twin in this example may rely on a source congruency strategy (e.g., distributed consensus algorithms where M of N has a threshold logic i that defines minimum inputs for consensus) to reliably get a consensus view. In some cases, twin may be a misnomer as it may be three of five or seven of eight threshold logic. For example, when evaluating the integrity of a DT execution image (e.g., that the DTs share), a consensus approach may be applied to evaluate attestation results for a primary and the DTs so that each node evaluates each other node. If a node has an attestation result that differs from the majority the DT is removed from the DT resiliency scheme. If the primary is voted out, then an orchestrator node may review the primary against a service level agreement (SLA).

A digital twin may be used for misbehavior detection, for example, to check whether actors are near its location, determine speed, determine trajectory, determine maneuver intention, etc. Data reported by a vehicle in a V2X message may be compared to data that the digital twin infrastructure observes from its sensors to detect misbehavior. Certain vehicle behaviors (e.g., high speed, reckless, risky, illegitimate lane change, etc.) may trigger the digital twin infrastructure to analyze potential misbehavior. For example, by detecting potential misbehaving vehicles and taking proper actions to protect/warn road actors.

Allowing M-of-N threshold logic using available cameras may be more reliable than being limited to only infrastructure cameras. Nevertheless, consumer grade cameras may not be equipped with adequate privacy protection, anonymization, and analytics processing capabilities. Careful management of software/firmware and attack mitigation strategies for consumer cameras may be as reliable as a purpose-built infrastructure. M-of-N redundancy using ubiquitous consumer grade cameras may be highly reliable and resilient. Applying M-of-N threshold logic to the digital twins allows higher reliability at little added infrastructure cost.

Figure 12:
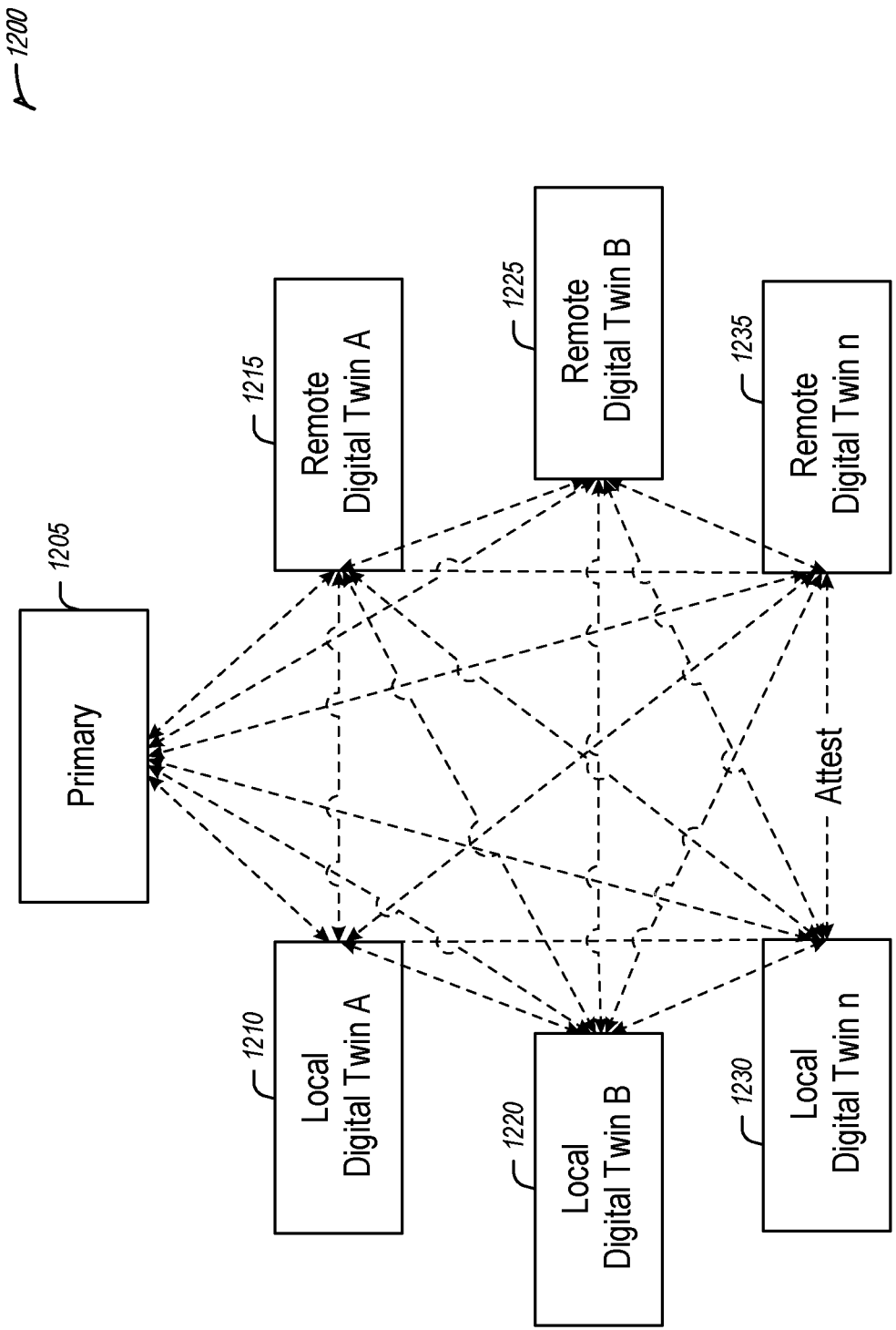
FIG. 12 illustrates an M-of-N attestation example between a primary edge computing node and its digital twin community for a digital twin framework for next generation networks, according to an embodiment.

FIG. 12 illustrates an M-of-N attestation 1200 example between a primary edge computing node 1205 and its digital twin community (e.g., local digital twin A 1210, remote digital twin A 1215, local digital twin B 1220, remote digital twin B 1225, local digital twin n 1230, and remote digital twin n 1235) for a digital twin framework for next generation networks, according to an embodiment. Each node 1205, 1210, 1215, 1220, 1225, 1230, and 1235 attests the other nodes in the community. If an M-of-N threshold agree that a common node does not satisfy the attestation policy, that node is recommended to a remediation agent such as an orchestrator node for remedial actions. An attestation policy, reference values, certificates, and other endorsements are provisioned by an orchestrator node that is commonly trusted by all the nodes 1205, 1210, 1215, 1220, 1225, 1230, and 1235.

Consistency and synchronization may be challenges in a digital twin infrastructure. Execution checkpointing is used to synchronize a DT while the primary environments (e.g., VNF, container, etc.) performs the workload, function, or operation. Multiple local DTs may be synchronized to a primary. Local DTs may further synchronize to one or more remote DTs. Operational consistency and synchronization functions are generally applied after m-way attestation across the DT cluster. However, strictly speaking, for any pairwise interaction across nodes of the cluster, attestation precedes the pairwise interaction.

Figure 13:
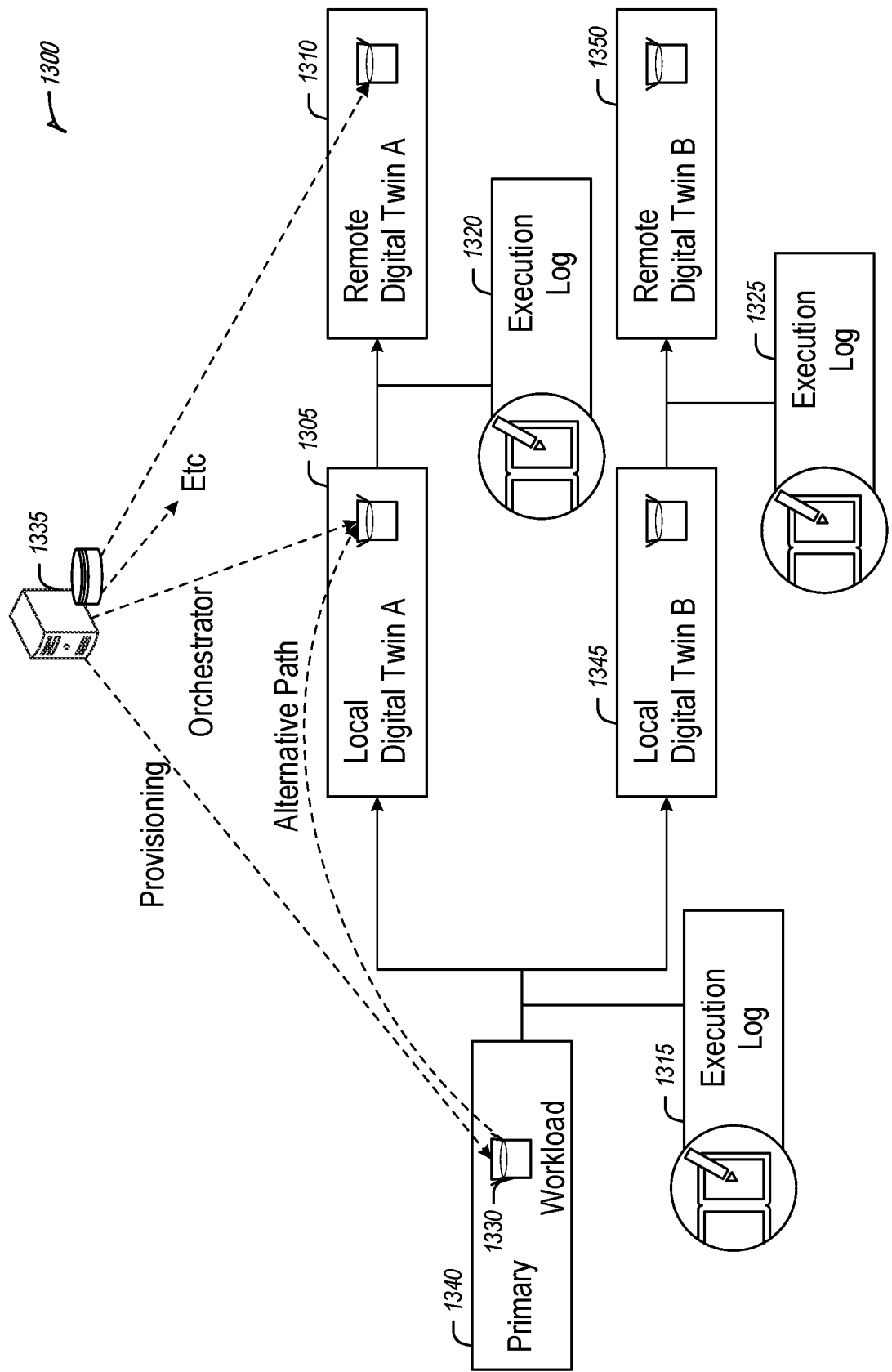
FIG. 13 illustrates an example of a local and remote digital twin architecture with execution logs and workload provisioning for a digital twin framework for next generation networks, according to an embodiment.

FIG. 13 illustrates an example of a local digital twin 1305 and remote digital twin 1310 architecture 1300 with execution logs 1315, 1320, and 1325 and workload 1330 provisioning for a digital twin framework for next generation networks, according to an embodiment. An orchestrator node 1335 provides the workload 1330 (e.g., VNF, container, etc.) to participating DTs (e.g., the local digital twin 1305 and the remote digital twin 1310) and to the primary 1340. The DTs may execute slightly behind the primary 1340 relying on the execution checkpoint log 1315, 1320, and 1325 for execution synchronization. The local DT A 1305 may generate an execution checkpoint log 1320 that is shared with the remote DT A 1310. Due to inherent network latency between the local DT A 1305 and the remote DT A 1310, the remote DT A 1310 may follow the execution of the local DT A 1305 with increased latency.

Alternate provisioning paths are possible for the workload 1330 from the primary 1340 to the local DT A 1305 and a local digital twin B 1345 where the primary 1340 provisions the local DT A 1305 and the local DT B 1345 and/or the local DT A 1305 and the local DT B 1345 provisions the remote DT A 1310 and a remoted digital twin B 1350, respectively.

Figure 14:
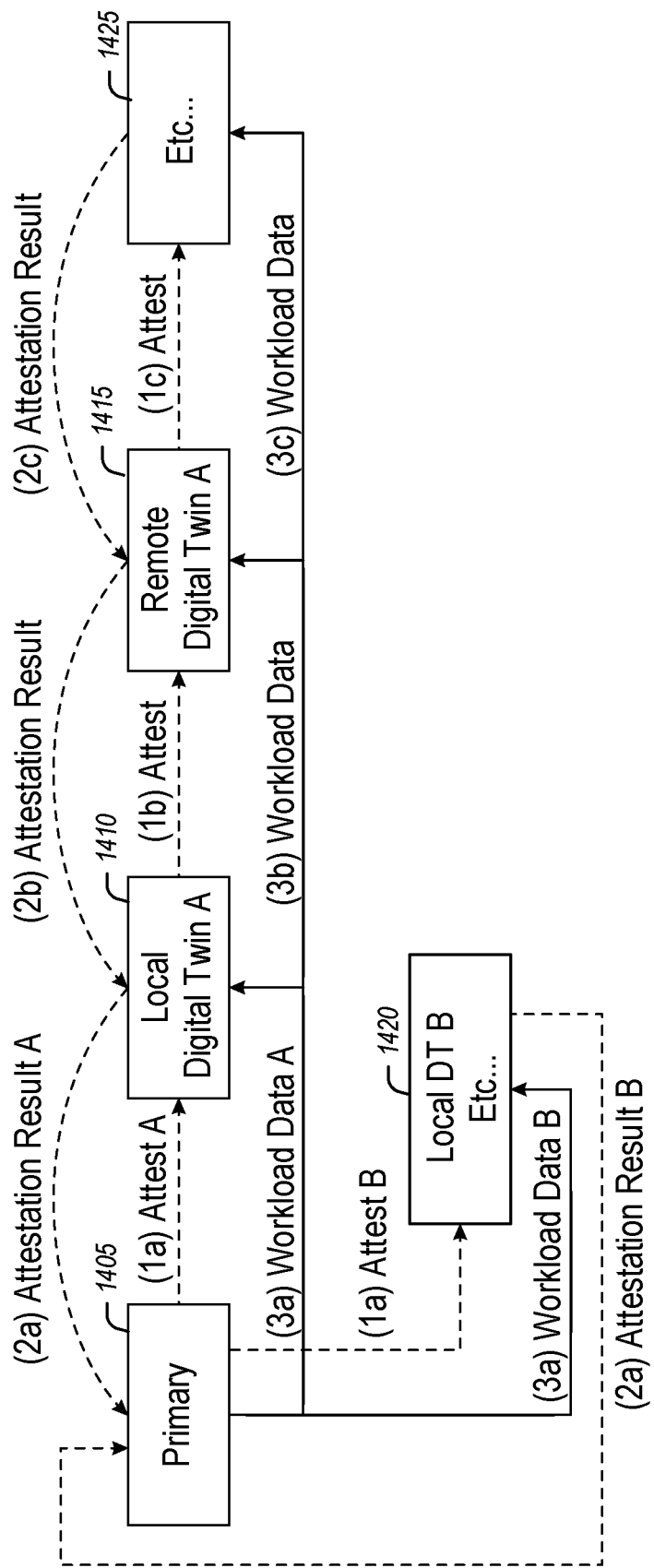
FIG. 14 is a data flow diagram the illustrates an example of digital twin attestation flow for a digital twin framework for next generation networks, according to an embodiment.

FIG. 14 is a data flow diagram the illustrates an example of digital twin attestation flow 1400 for a digital twin framework for next generation networks, according to an embodiment. As shown in FIG. 14, attestation flow is shown in three steps where in step 1, a primary 1405 requests attestation (1a) of a local digital twin A 1410 (and a local digital twin B 1420, if available). In step 2, an attestation result is returned (2a) where it is evaluated by the primary 1405. In step 3, workload data and execution progresses (3a) (if the attestation was successful and an attestation policy is satisfied). The attestation steps may cascade in similar fashion from the local digital twin A 1410 to a remote digital twin A 1415 using attestation request (1b), attestation result (2b), and workload data transfer (3b), and so forth for any additional digital twins 1425. In some cases, mutual attestation will be applied (e.g., based on policy) to ensure that the DTs are receiving workload, policy, tenant data from the correct primary 1405. If a workload interaction occurs between a network node and the primary DT node, and the interaction is preceded by an attestation of the Primary. Before a portion of the workload is shared across either local or remote DT nodes of the primary, attestation of DT nodes is performed as a pre-requisite. Attestation evidence from the internal DT nodes may be conveyed to the network node consequently and the network node may re-evaluate attestation results that may cause the workload to be cancelled or restarted as a condition of interior DT nodes attestation values being determined to be unacceptable by the external network node or one of its relying party nodes.

Figure 15:
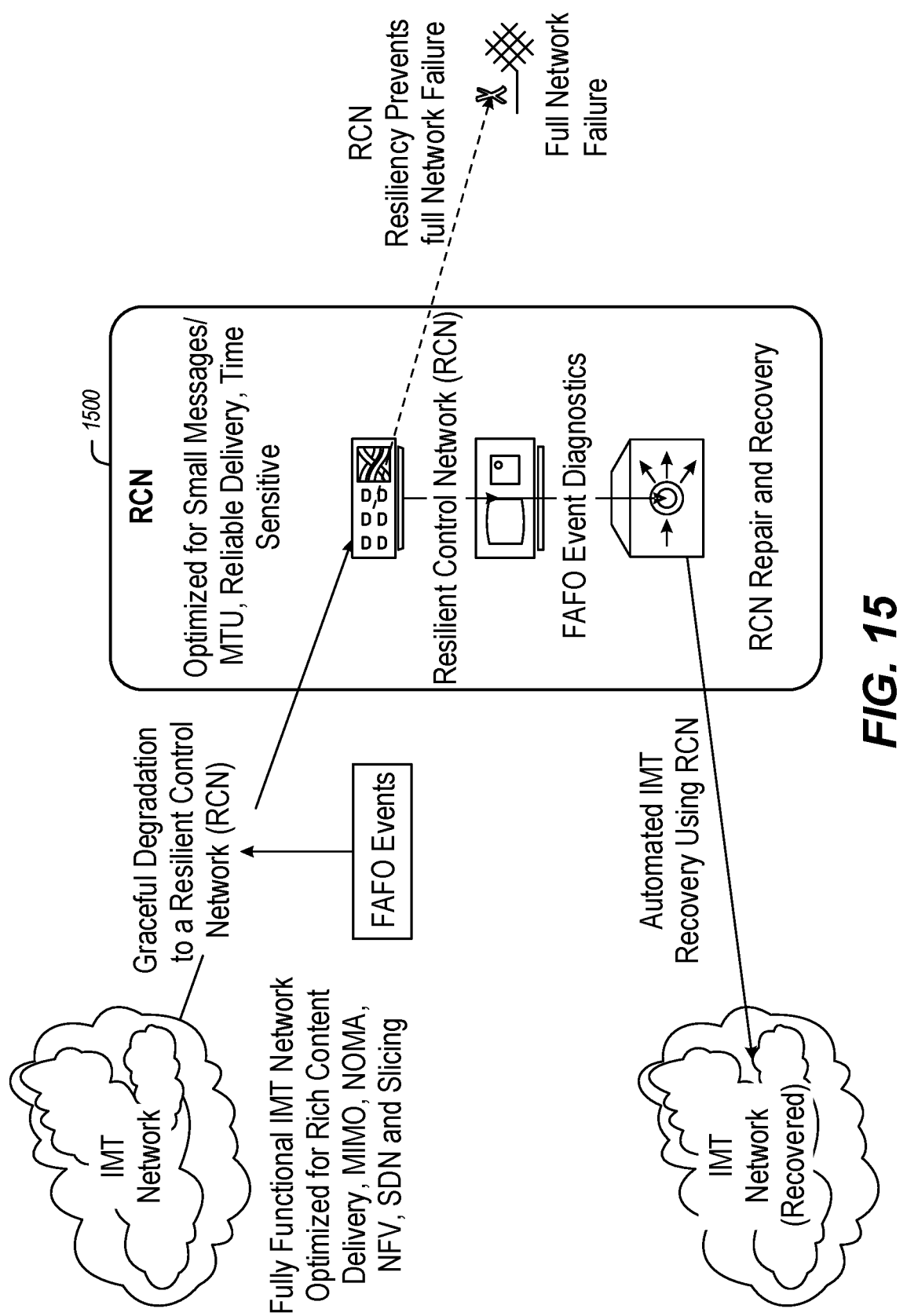
FIG. 15 illustrates an example of a resiliency control network for a digital twin framework for next generation networks, according to an embodiment.

FIG. 15 illustrates an example of a resiliency control network 1500 for a digital twin framework for next generation networks, according to an embodiment. The resiliency control network (RCN) 1500 is an underlay network that exists in nodes in a regular network where, in the event of FAFO events that make the production network unavailable, the RCN 1500 intercedes to rebuild a connected RCN network, then reboots the production network. In the case of sparcified DTs, the RCN 1500 reconstructs local and remote DTs, recovers execution logs, integrity checks workload/container images for primary and DTs, establishes a common execution synchronization point, and restarts execution (which implies re-attestation).

Resiliency-by-design applies concepts such as a resilient root of trust (RRoT), resilient control network (RCN) 1500, quarantine control network (QCN), a resilient approach to data definition across a spectrum of data encoding formats for the same data, resilient telemetry collection, and a resilient approach to graceful degradation from a network optimized for content streaming to one optimized for reliable control functions and automated recovery back to a network optimized for content streaming. The digital twin approach may be applied within this context when a network is optimized for streaming high-throughput content and when optimized for low-throughput control messages or content. The digital twin approach ensures there is redundancy built into each network node and at every phase of operation.

The systems and techniques discussed herein enable resilient digital twins across several FAFO scenarios. In an example, hardware changes may break a root-of-trust for either the primary or the digital twin. In another example, an untrustworthy data exchange (e.g., caused by fault, deliberate attack, etc.) may be passed as input to the digital twin resulting in both the primary and the digital twin obtaining incorrect data. In yet another example, failure or unavailability of a primary data forwarding path may result in dissimilar data images between the primary and the digital twin. Redundancy enables a DT to be resilient against the example issues described above. DT redundancy may be expanded to a cluster of digital twins that provides layered redundancy.

Attestation may be used to detect dissimilar configurations and dissimilar data across a primary to digital twin interface. Attestation equivalence for a community of DT nodes is known as a DT equivalence cluster (DTEC). An attestation policy for a DTEC, a DTEC attestation appraisal policy (DAAP), is common across DT nodes such that any DTEC node may act as an attestation verifier for other nodes. If the DTEC nodes are constructed with a resilience root-of-trust (RRoT), then attestation based on a DAAP will recognize and accept all RRoTs as equivalently trustworthy. RRoTs are part of a comprehensive international mobile telecommunications (IMT) resiliency strategy that ensures DTEC nodes may cycle through a reset to recover from an FAFO event.

The systems and techniques discussed herein ensure the following resiliency properties exist within a DTEC. Cryptographic identity management, via resiliency roots-of-trust (RRoT), ensures both a unique identifier and a class identifier exists for the DTEC and may accommodate hardware replacement/failure such that the DTEC identities remain consistent (or equivalently consistent according to a DAAP). Failure handling of the DT primary, via a hot standby mode operation of any DT, achieves preservation of DTEC identity and attestation of the DTEC based on a class/group attestation key, common/group authentication, or forensics identity key, and supply chain chain-of-custody keys that track DTEC member nodes through the supply chain to deployment as a DT cluster. Thus, given primary endpoint failure, the DTEC digital twins may process a workload without invalidating an attestation results state by a verifier and the relying party nodes associated with a verifier. Resilient-by-design where a resilient root of trust (RRoT), resiliency control network (RCN), resilient telemetry collection and resilient failure/degradation may transition a network optimized for content streaming to one optimized for resiliency control and back again. The DTEC may be applied while the network is optimized for streaming, etc. and while optimized for resiliency control.

DTEC may bridge multiple levels (e.g., a hierarchy, etc.) of available edge and cloud computing resources to host primary and digital twins so that scarce edge computing resources are utilized in an efficient manner. Prediction of DTEC resource requirements may avoid resource contention and network congestion while maintaining balance between compute and communication bottlenecks. The DTEC digital twin approach ensures there is redundancy built in at each phase of network operation and during transitions to/from normal/recovery modes. The DTEC digital twin approach reduces the amount of information that must be collected and managed during transitions between optimized content services (e.g., optimal data plane operations) and gracefully degraded failure-resilient operations (e.g., robust control plane operations). Recovery operations may be driven top-down at each DTEC concurrently to speed up time to repair and time to recover to normal operation.

DTEC is a composition and decomposition primitive that simplifies management of digital twin clusters. DTEC grouping of resources reduces latency of resiliency operations such as FAFO repair and recovery. In an example, a resiliency framework for digital twins (DT) and DTEC clusters is defined that relies on cluster-based attestation to establish a consistently trusted cluster for a workload that exists (nearly) simultaneously on several digital twin environments. Attestation consists of several attestation roles (e.g., functions) that may be shared among various entities and network nodes.

Attestation roles may include:

Attester—a node in the network that seeks to become a member of the DT cluster.

Verifier—other nodes in the DT cluster that admit/deny new members.

Verifier owner—the network/DT cluster administrator, tenants, or orchestration entities that configure, manage, and provision the DT cluster nodes.

Reference value provider (RVP)/Endorser—a vendor, supplier, and retail ecosystem that produces expected values for attestation evidence.

Relying parties—any other entity in the network that may rely on attestation results such as auditors, compliance, underwriters, brokers, other tenants, etc.

The DTEC includes traditional next generation mobile edge network services including orchestration, service and server management, user agents, etc. A framework is created for managing and deploying DT clusters. The DTEC consists of dynamic DT cluster formation, node/resource discovery, and DT cluster provisioning and de-provisioning. Attestation is part of DT cluster formation where each cluster node is permitted to join the cluster if the other existing members approve. Approvals are based on a trustworthy assessment of the pledge node according to resiliency, security, and trustworthiness properties. Attestation reports details of these properties found in the pledge node. Existing members share resilience, security, and trustworthiness policies that appraise the pledge node and determine whether to allow/deny membership. The pledge has resilience and security features built into its hardware and firmware. These features are called resilience root-of-trust (RRoT) and security root-of-trust (SRoT). The RRoT and SRoT work together to ensure resilience in both a stand-alone operational mode as well as a connected (e.g., DT cluster) mode.

Figure 16:
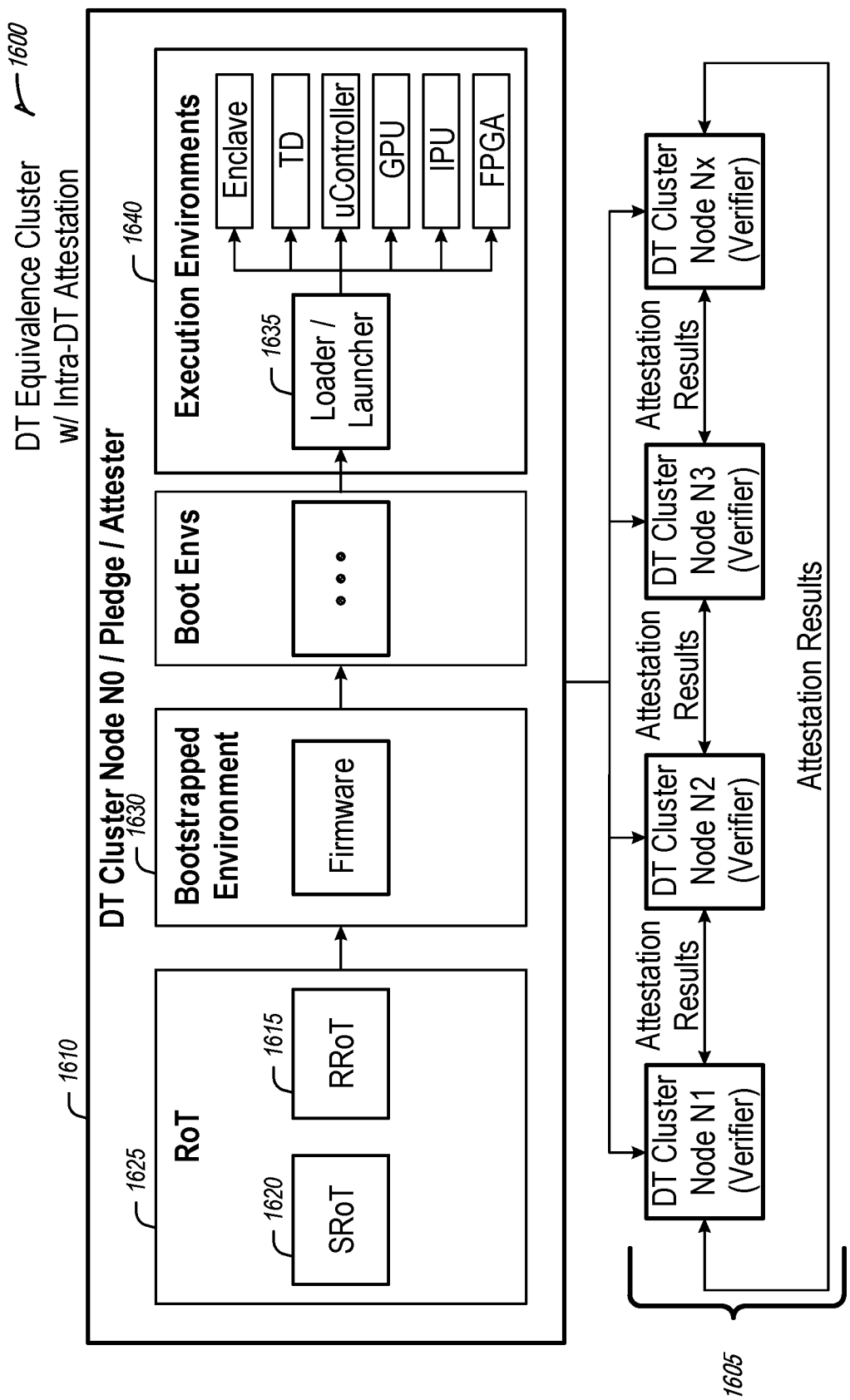
FIG. 16 illustrates an example of a digital twin cluster with attestation and a digital twin cluster node having a resilience root of trust (RRoT) and a security root of trust (SRoT) for a digital twin framework for next generation networks, according to an embodiment.

FIG. 16 illustrates an example of a digital twin cluster 1600 with attestation 1605 and a digital twin cluster node 1610 having a resilience root of trust (RRoT) 1615 and a security root of trust (SRoT) 1620 for a digital twin framework for next generation networks, according to an embodiment. As shown in FIG. 16, the DT cluster node 1610 includes a root of trust (RoT) 1625, bootstrapped environments 1630, loader/launcher environments 1635, and execution environments 1640 where various execution environments are available for workload hosting. The arrangement of environments is called the node environment model (NEM). Attestation 1605 reports the node environments and which environment hosts the shared DT workload. Attestation evidence records the security dependencies among the various environments. The DT cluster node 1610 (Node NO), pledges to join the DT cluster 1600. The DT cluster node 1610 attests to each cluster node and cluster nodes share attestation results. If all nodes find the pledge's attestation evidence is valid (e.g., consistent with evidence presented to the other DT nodes) and the attestation results are accepted by the shared DT cluster policy (DAAP), then the pledge node (e.g., the DT cluster node 1610) is admitted into the cluster.

The DAAP contains a series of approximately equal NEMs used to assess equivalences. If the sequence of how the execution environment is booted is important, then the series of environment dependencies is also contained in the DAAP.

Figure 17:
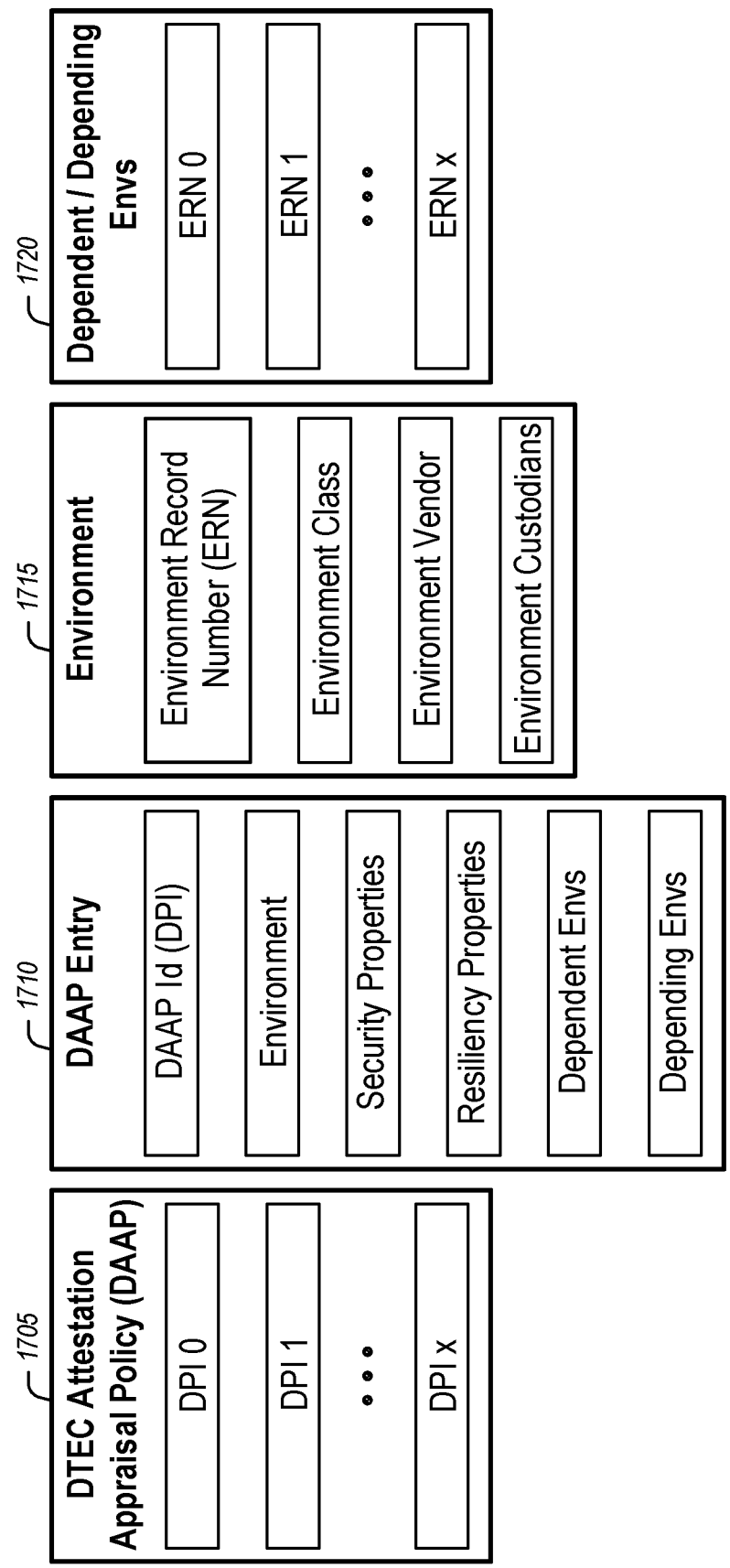
FIG. 17 illustrates an example of a digital twin equivalence cluster (DTEC) attestation appraisal policy (DAAP) layout for a digital twin framework for next generation networks, according to an embodiment.

FIG. 17 illustrates an example of a digital twin equivalence cluster (DTEC) attestation appraisal policy (DAAP) layout 1700 for a digital twin framework for next generation networks, according to an embodiment.

The schema for the DAAP layout 1700 includes a list of DAAP IDs (DPIs) 1705 used to index into a table of DAAP entries 1710 consisting of an equivalence environment, security properties, resiliency properties of the environment. If there are security or resiliency dependencies in other environments, such as root of trust, bootstrapped and loader launcher environments then these dependencies 1720 are listed as well. An environment 1715 is described by a class identifier that is assigned by the device vendor/manufacturer, the name of the vendor/manufacturer, a record number, and potentially a list of entities that were the custodians of the environment during its lifecycle.

When evaluating a DAAP, each verifier node consults the DAAP 1705 to see if there is an equivalent but not identical DT equivalence node defined. If the evidence from the pledge node matches a DAAP entry 1710 for any DPI in the DAAP 1705, then it is considered equivalent. The environment of the verifier is also contained in the DAAP 1705. The verifier may perform this search itself (though that may be a conflict of interest) or the other DT cluster nodes may periodically recheck each other.

A RRoT may be involved in safe transitions of the operational state of the node that is affected by a FAFO event. This may include safe transition directly to a reset vector or fine-grained state transition to a bootstrapped state or a safe transition to a relaunch or reload scenario.

Figure 18:
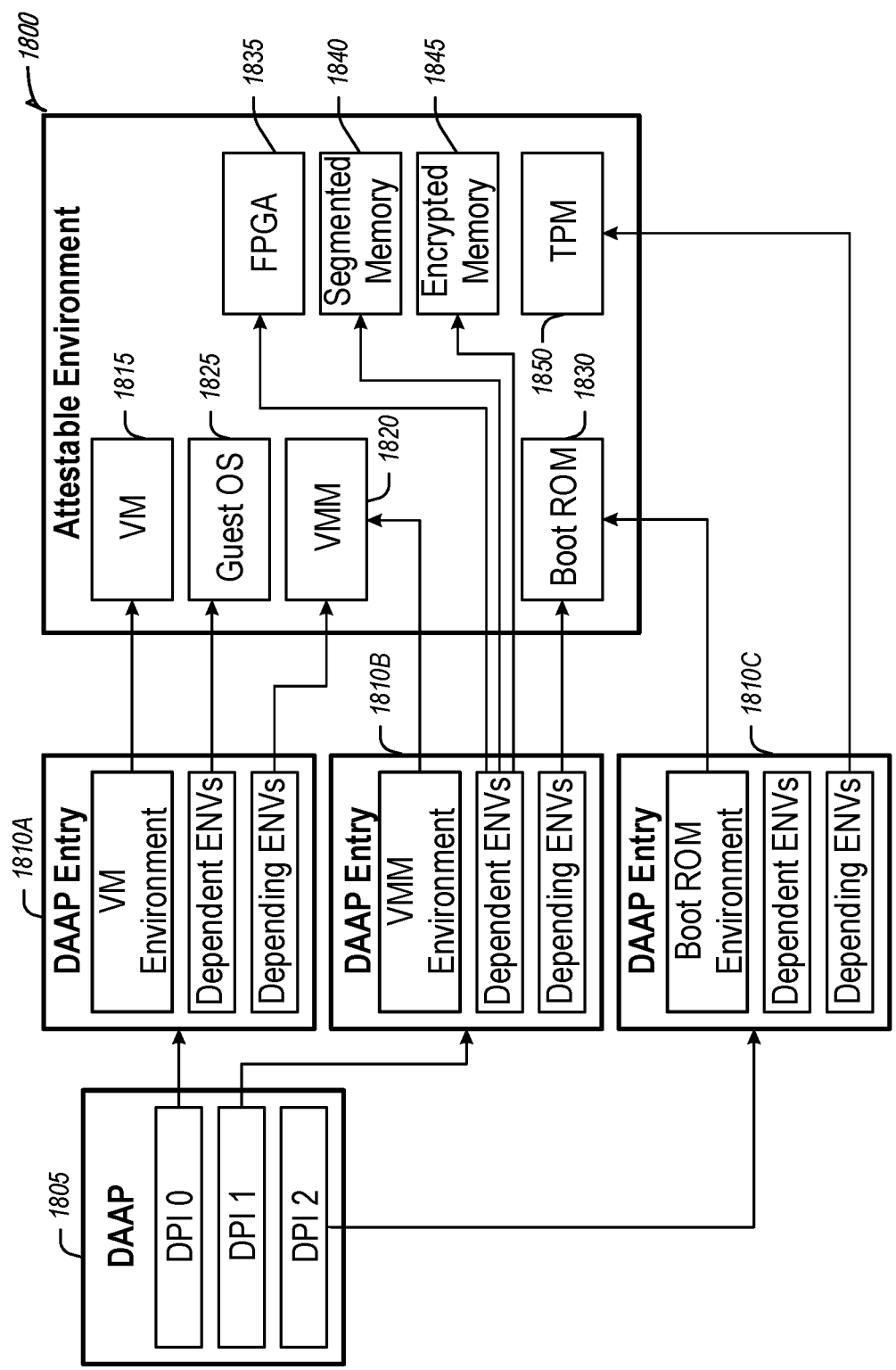
FIG. 18 illustrates an example of a digital twin equivalence cluster (DTEC) attestation appraisal policy (DAAP) for a digital twin framework for next generation networks, according to an embodiment.

FIG. 18 illustrates an example of a digital twin equivalence cluster (DTEC) attestation appraisal policy (DAAP) for an attestable environment with equivalence components 1800 for a digital twin framework for next generation networks, according to an embodiment.

In FIG. 18, an exemplary DT attestation policy 1805 shows a DAAP entry containing a set of logically equivalent DAAP entries, DAAP entry 1810A, DAAP entry 1810B, and DAAP entry 1810C. While each of the DAAP entries 1810A, 1810B, and 1810C include different environments, they are logically equivalent. DAAP entry 1810A may refer to a virtual machine (VM) environment 1815 that depends on a virtual machine manager (VMM) 1820 for security and trust properties. A guest OS 1825 is a dependent environment that relies on the VM 1815 for its security and trust properties. A cascade of dependencies may exist among the logically equivalent environments in 1810. For example, the VMM 1820 environment may depend on a boot read-only memory (ROM) 1830 and may have dependent environments field-programmable gate array (FPGA) 1835, segmented memory 1840, encrypted memory 1845, etc. Further, the boot ROM 1830 environment may depend on a trusted platform module (TPM) 1850. The TPM 1850 is a root-of-trust that may not depend on other environments. DAAP entry 1810B, and DAAP entry 1810C The DAAP entry policy 1805 details expected security and resiliency properties. During an attestation of a DTEC node, the verifying node may rely on the DAAP entries in policy 1805 to assess and appraise the attesting DTEC node to establish compliance with the expected security and resiliency according to the DAAP Entry policy 1805.

Figure 19:
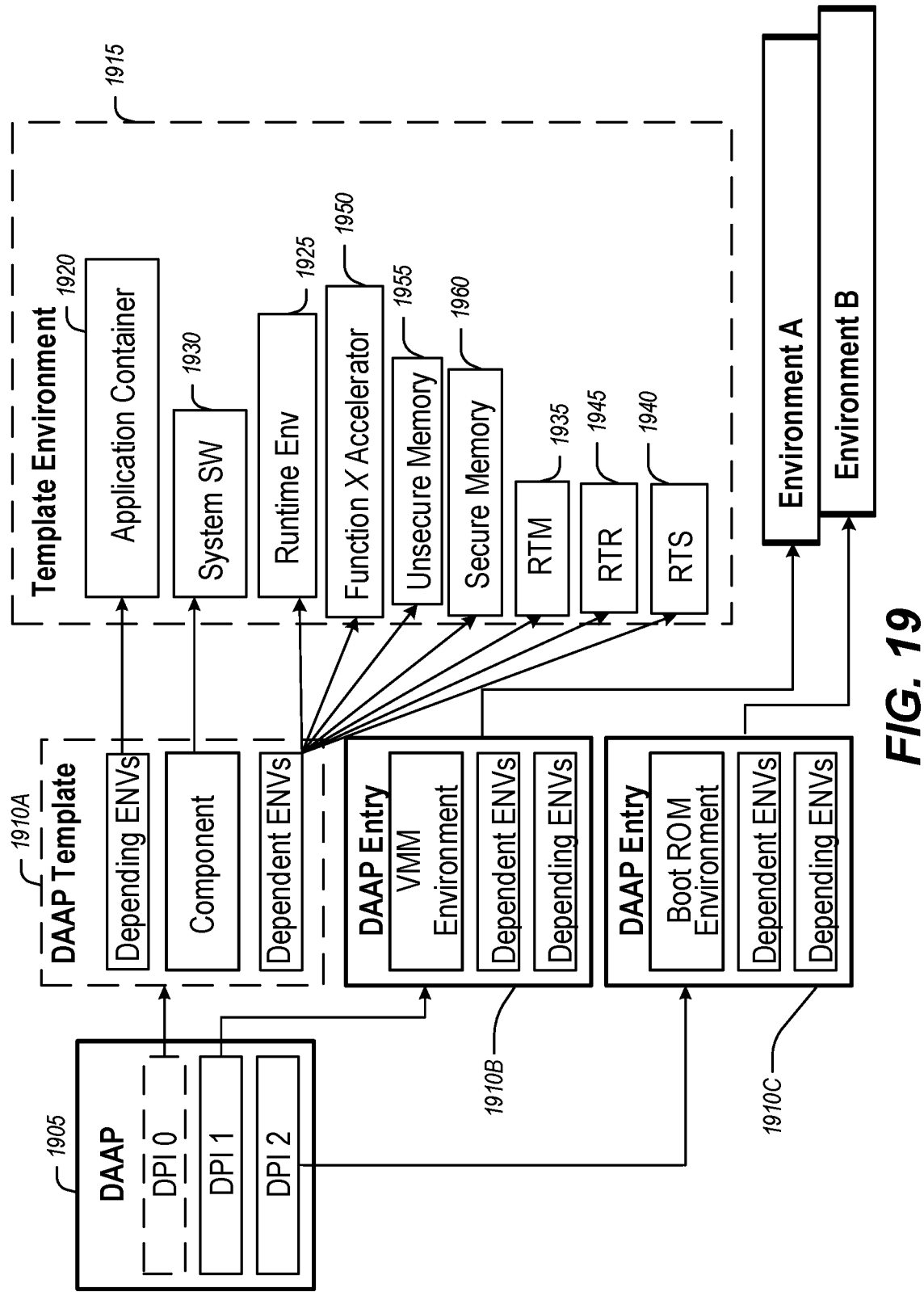
FIG. 19 illustrates an example of a digital twin equivalence cluster (DTEC) attestation appraisal policy (DAAP) template for an attestable environment with a template environment for a digital twin framework for next generation networks, according to an embodiment.

FIG. 19 illustrates an example of a digital twin equivalence cluster (DTEC) attestation appraisal policy (DAAP) template 1910A for an attestable environment with a template environment 1915 for a digital twin framework for next generation networks, according to an embodiment.

In FIG. 19, an exemplary DT attestation policy 1905 includes a set of logically equivalent DAAP entries, DAAP template 1910A, DAAP entry 1910B, and DAAP entry 1910C. While each of the DAAP entries 1910A, 1910B, and 1910C include different environments, they are logically equivalent. In an example, a digital twin may not be attestable using a DAAP entry such as the DAAP entry 1910B or the DAAP entry 1910C. The DAAP template 1810A may refer to a template environment 1915 that includes a set of attestable environmental elements. The DAAP template 1910A may include an ontology of a taxonomy of attestable environmental elements referred to in the template environment 1915. For example, the template environment may include definitions for an application container 1920, system software 1930, a runtime environment 1925, root of trust for measurement (RTM) 1935, root of trust for storage (RTS) 1940, root of trust for reporting (RTR) 1945, a function X accelerator 1950, unsecure memory 1955, and secure memory 1960.

If a digital twin is unable to be attested using a preconfigured DAAP entry, the DAPP template 1910A may be accessed and a DAPP entry may be created for the potential digital twin. In an example, fragments of candidate digital twins may be combined to assemble an attestable digital twin. For example, a first candidate may include attestable storage while a second candidate may include attestable memory and the candidates may be formed into a composite digital twin that allows the first candidate and the second candidate to be attestable as a digital twin when working in coordination. This enables digital twin creation where a single entity may lack the attestable elements to self-attest as a digital twin. The DAPP template 1910A contains class/type identifiers for system composition. The DAAP entries are constructed from the DAAP template 1915. It may be possible to detect a DAAP entry that is incomplete if it doesn't populate an item in the template. A DAAP entry may represent multiple template type entries (e.g., a trusted platform module (TPM) consists of an RTR and an RTS).

If a DAAP entry points to a component that is not identified by the DAAP template 1910A, that alone may not necessarily invalidate the DAAP policy 1905. However, additional elements may be ignored when computing logical equivalence. For example, if unsecure memory 1955 is not in the template, but is in a DAAP policy, a second DAAP entry that omits unsecure memory 1955 may be used as a DT of the first. For a given component of the template environment 1935, there may be multiple possible fragments/components that may be used to satisfy a requirement of the template environment 1935. For example, a device identifier composition engine (DICE) root of trust as implemented by a memory controller X or a field programmable gate array (FPGA) bring-up module Y may be equivalent in the template environment 1935. Equivalencies may be characterized in a manifest such as a concise reference integrity manifest (coRIM) where a type of an object in the template environment 1935 is defined according to a class identifier. The manifest reference defines a class-map that is a formal data definition structure.

The DAAP entry policy 1805 details expected security and resiliency properties. During an attestation of a DTEC node, the verifying node may rely on the DAAP entries in policy 1805 to assess and appraise the attesting DTEC node to establish compliance with the expected security and resiliency according to the DAAP entry policy 1805.

Figure 20:
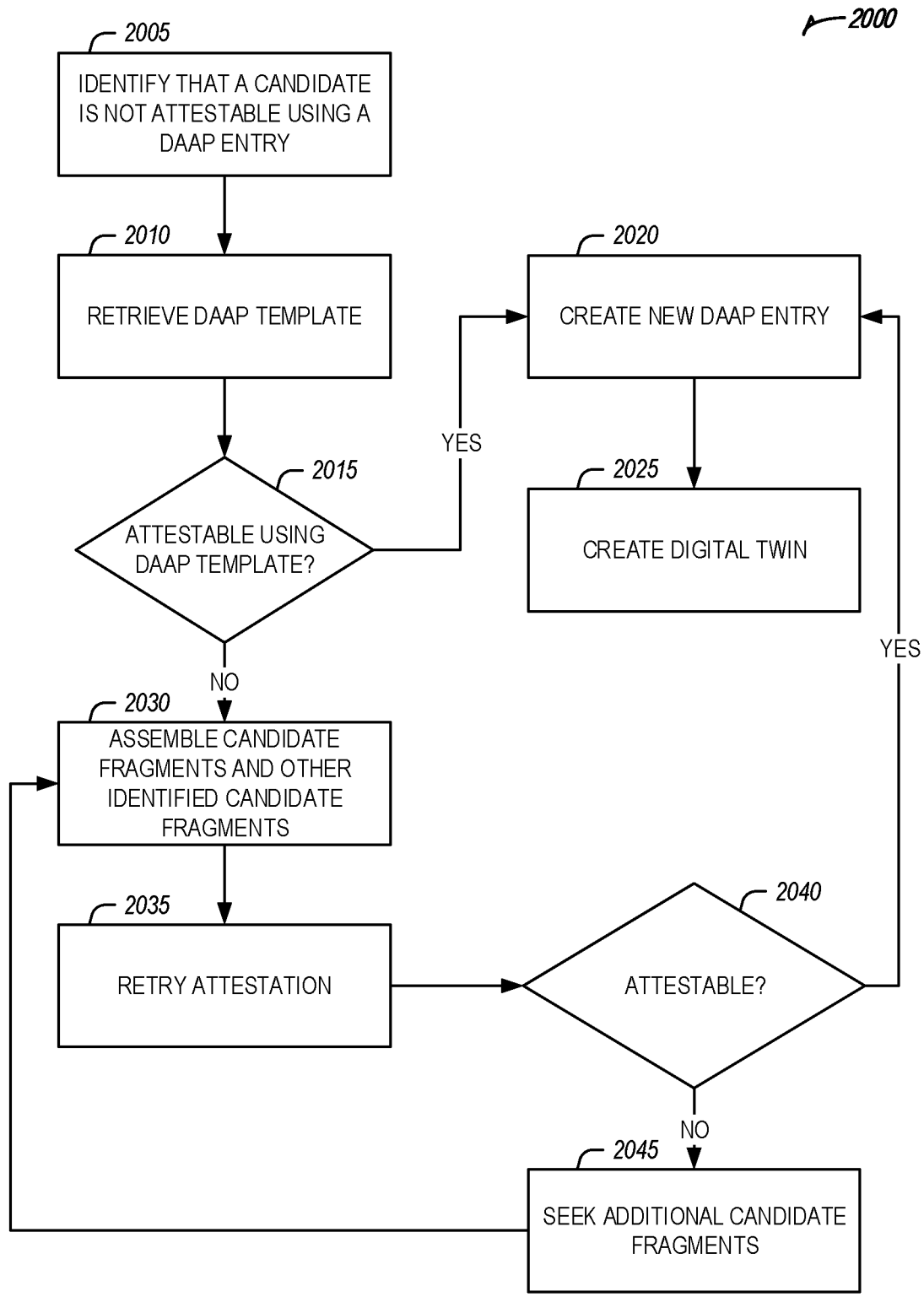
FIG. 20 is a flow chart of an example of a process for attestation of a digital twin using a digital twin equivalence cluster (DTEC) attestation appraisal policy (DAAP) template digital twin framework for next generation networks, according to an embodiment.

FIG. 20 is a flow chart of an example of a process 2000 for attestation of a digital twin using a digital twin equivalence cluster (DTEC) attestation appraisal policy (DAAP) template digital twin framework for next generation networks, according to an embodiment.

It may be identified that candidate digital twin is not attestable using a DAAP entry (e.g., at operation 1005). A DAAP template may be retrieved from a DAAP (e.g., at operation 2010). It may be determined if the template may be used to build a DAAP entry that may be able to attest the candidate digital twin (e.g., at decision 2015). If so, a new DAAP entry is created (e.g., at operation 2020) and a digital twin is created for the candidate digital twin (e.g., at operation 2025).

If it is determined that the candidate digital twin is not attestable using the DAAP template (e.g., at decision 2015), attestable fragments from the candidate digital twin and other candidate (or attested) digital twins may be identified and assembled to create a cooperative composite digital twin candidate (e.g., at operation 2030). Attestation of the cooperative composite digital twin candidate may be reattempted (using DAAP entries and the DAAP template)(e.g., at operation 2035. It may be determined if attestation was successful (e.g., at decision 2040). If so, a new DAAP entry is created for the cooperative composite digital twin candidate in the DAAP (e.g., at operation 2020) and a digital twin is created for the cooperative composite digital twin candidate (e.g., at operation 2025). Thus, the digital twin may only be attestable when the fragments used to assemble the cooperative composite digital twin candidate are working in unison.

If it was determined that attestation was unsuccessful (e.g., at decision 2040), additional fragments may be identified and the process 2000 may continue to assemble candidate fragments to attempt to build an attestable digital twin (e.g., resuming at operation 2030).

Figure 21:
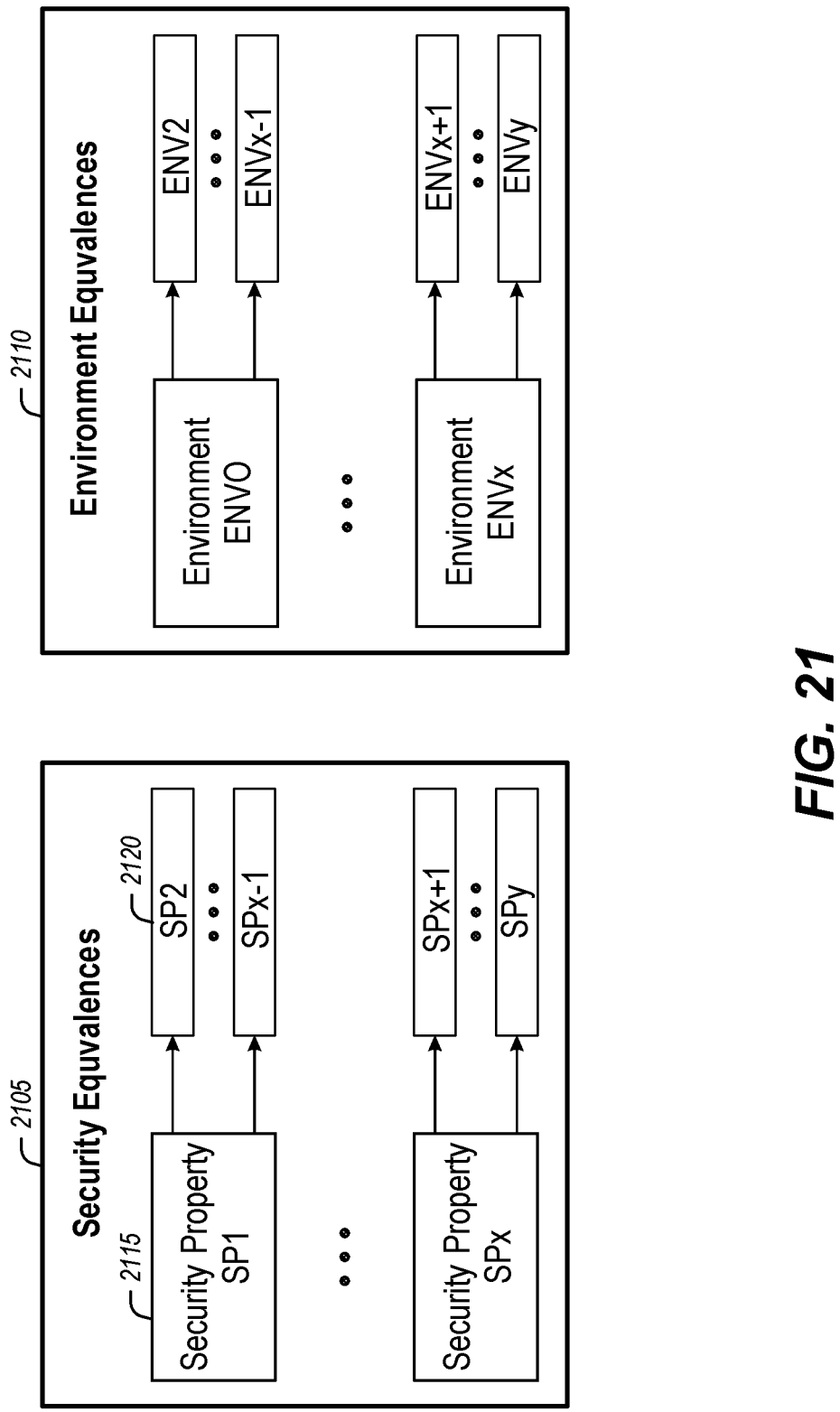
FIG. 21 illustrates an example of security and environment equivalences for a digital twin framework for next generation networks, according to an embodiment.

FIG. 21 illustrates an example of logical security equivalencies 2105 and logical environment equivalences 2110 for a digital twin framework for next generation networks, according to an embodiment. A DAAP may include security and resiliency policy equivalences 2105 where a security property 2115 may be associated with other security properties 2120 that are approximately equivalent. For example, for a security property of strength of function for asymmetric key size of 1024 bits of Rivest-Shamir-Adleman (RSA) key, an equivalent symmetric key size of 128 bits of advance encryption standards (AES) key is given. Similarly, environment resiliency equivalences 2110 may be specified (e.g., a resilience policy describing resource redundancy a not-and (NAND) storage resource may be equivalent to a hard disk drive (HDD) storage resource). Equivalences are used by attestation verifiers and DTEC management controllers to arrive at approximately equal security and resilience configurations for the purpose of evaluating and establishing that a DTEC cluster has similar security and resilience properties among the various member nodes.

Figure 22:
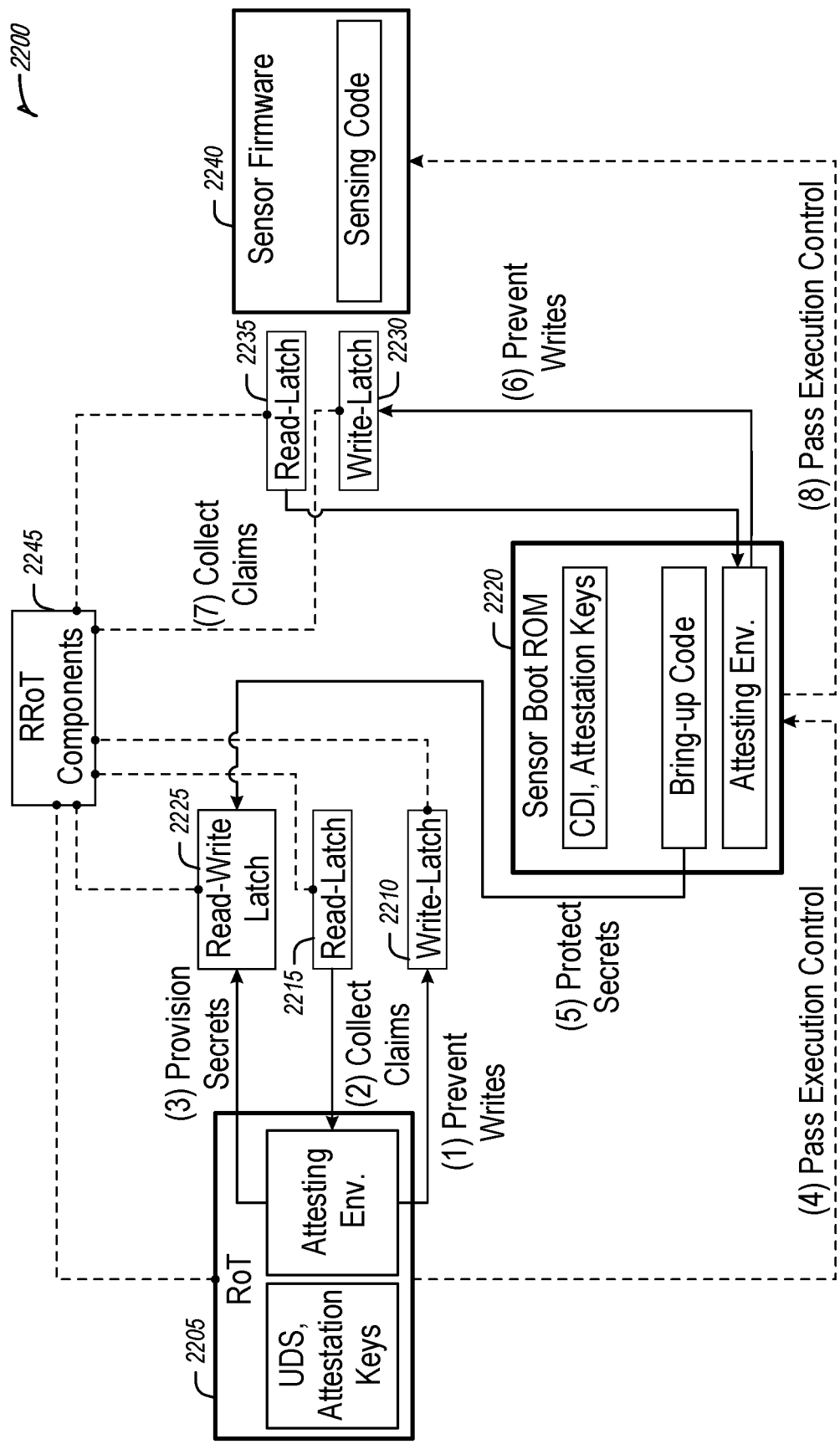
FIG. 22 illustrates an example of a safe bootstrap involving read/write latches of a digital twin node that supports attestable bootstrap environments for a digital twin framework for next generation networks, according to an embodiment.

FIG. 22 illustrates an example of a safe bootstrap 2200 involving read/write latches of a digital twin node that supports attestable bootstrap environments for a digital twin framework for next generation networks, according to an embodiment.

A RoT 2205 receives a reset vector, initializes RoT resources, and sets a write latch 2210 guarding the RoT resources from possible tampering. The RoT sets a read latch 2215 protecting the next environment (e.g., sensor boot environment 2220 (sensor boot ROM)) from being written to by the RoT or any other entity. The RoT measures (e.g., reads) the boot environment collecting claims such as a digest of the bootstrap firmware. The RoT 2205 computes seeds, secrets, keys, or other information specific to the sensor boot environment 2220 and provisions to the sensor boot environment 2220. It sets a read-write latch 2225 to protect the memory from being written by anything other than the RoT 2205 and, upon successful write operations, to prevent the RoT 2205 from subsequent read operations (e.g., to protect any other secrets not previously known to the RoT 2205). The RoT 2205 deletes secrets (e.g., keys) that are specific to the sensor boot environment 2220.

The RoT 2205 transfers execution control to the sensor boot environment 2220. The sensor boot environment 2220 sets the read-write latch 2225 to further prevent the RoT 2205 from reading its secrets. A simple analogy is a hotel room which has a shared door. Both sides of the door have a locking mechanism that opens only when both locks are open. The sensor boot environment 2220 repeats similar steps performed by the RoT 2205 and applies them to the execution environment. A write latch 2230 is set to prevent write operations to the execution environment memory. A read latch 2235 is set to enable read-only access to code regions of the execution environment where claims are collected such as computing a digest of the runtime, application, configuration, and data.

The sensor boot environment 2220 passes execution control to the execution environment (e.g., sensor firmware 2240). The execution environment protects secrets by setting read latches under the control of the sensor boot environment 2220 and other environments. It may reaffirm the write latch 2230 protections ensuring the sensor boot environment 2220 may further modify its environment (e.g., until there is an FAFO event upon which the RRoT 2245 may become active and configure latches as needed to restart/reboot the execution environment).

In an example, the DTEC elements may have finer granularity than is feasible to scale to higher levels of control, orchestration, and operation. A DTEC may cooperate within a wider graph of connected operations where DTEC cluster controls represent a strongly connected network of DTs. As graph reductions proceed, broader network operation at the various node, system, rack, or base station levels may be achieved through corresponding DTEC assemblies.

In another example, the DTEC may predict future demand for services and may assist in a determination of where to deploy micro-services including an optimal number of DT instances. DTEC nodes may bridge multiple levels (e.g., within a hierarchy) of available edge and cloud computing resources. Computing resources in an edge network are scarce as compared to cloud/core networks, hence judicious use of edge resources becomes important. Prediction of DTEC resource requirements may avoid resource contention and network congestion while maintaining balance between compute and communication bottlenecks.

Figure 23:
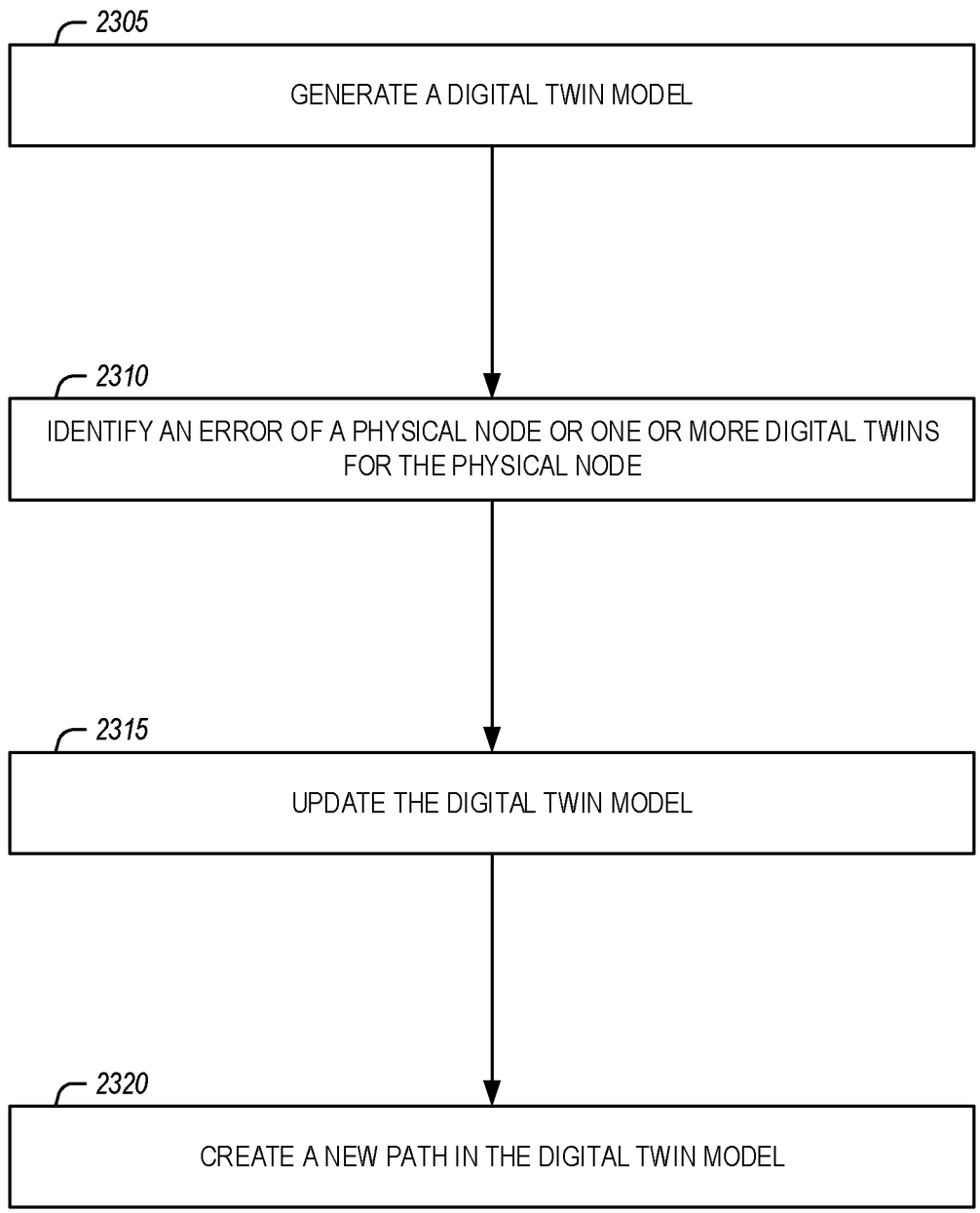
FIG. 23 is a flow chart of an example of a method for a digital twin framework for next generation networks, according to an embodiment.

FIG. 23 is a flow chart of an example of a method 2300 for a digital twin framework for next generation networks, according to an embodiment. The method 2300 may provide features as described in FIGS. 8-20.

A digital twin model may be generated for physical nodes in an edge network (e.g., at operation 2305). The digital twin model may include a digital twin for a physical node of the physical nodes. The digital twin may replicate the physical node. In an example, the physical nodes may be discovered in the edge network. In an example, the physical nodes may be discovered by a wireless broadcast messaging-based handshake protocol. In an example, the digital twin model may include synchronization paths between the physical node and the digital twin and between a first digital twin of the physical node and a second digital twin of the physical node. In an example, the digital twin model may be periodically (or dynamically) updated based on position, features, or trajectory of the physical node or the digital twin of the physical node.

In an example, generation of the digital twin model includes transmission of an attestation request to the physical nodes and receipt of attestation results from the physical nodes. A digital twin may be created corresponding to each physical node of the physical nodes based on the attestation results. The attestation request may be transmitted to the digital twin corresponding to each physical node of the physical nodes and attestation results may be received from the digital twin for each physical node of the physical nodes. The physical nodes and digital twin for each physical node of the physical nodes may be added to the digital twin model based on the attestation results from the physical nodes and the attestation results from the digital twin corresponding to each physical node of the physical nodes. In an example, the attestation request may be transmitted by a physical node of the physical nodes or a digital twin corresponding to each physical node.

In an example, an attestation appraisal policy may be created that includes an equivalency attestation policy. A unique identifier and a class identifier may be received in an attestation result from the digital twin. It may be determined that an attestation policy using the unique identifier leads to an attestation failure. The equivalency attestation policy may be selected based on the class identifier and attestation of the digital twin may be performed using the equivalency attestation policy. In an example, an environment model may be generated for the class identifier. The environment model may include attestation components available to nodes of a class and dependencies of nodes of the class. The equivalency attestation policy may be generated using the environment model. In an example, the equivalency attestation policy may include security equivalencies that define equivalent security attestation features and environment equivalencies that define equivalent environmental attestation features.

An error may be identified of the physical node or the digital twin for the physical node (e.g., at operation 2310). In an example, the error may be identified by an edge computing node, a second physical node, or a digital twin of the second physical node. In another example, the error may be identified based on receipt of degraded data from the physical node or the digital twin for the physical node, failure to receive data from the physical node or the digital twin for the physical node, or receipt of erroneous data from the physical node or the digital twin for the physical node. In yet another example, a coalition may be established that includes that includes peer physical nodes, digital twins of the peer nodes, and the physical node or the digital twin for the physical node. Output metrics may be received from members of the coalition, and it may be determined that output metrics from the physical node or the digital twin for the physical node are inconsistent with output metrics from the peer physical nodes and digital twins of the peer physical nodes. The error may be identified based on the inconsistency.

In an example, upon detection of the error, attestation of the physical node or the digital twin for the physical node is performed using a root-of-trust. Read and write latches may be set in memory during performance of the attestation. Execution of a workload may be transferred to another physical node or another digital twin. The digital twin model may be updated with another physical node or another digital twin and the read and write latches may be removed.

The digital twin model may be updated to halt communication with the physical node or the digital twin of the physical node (e.g., at operation 2315). A path may be created to another physical node or a digital twin of the another physical node in the digital twin model (e.g., at operation 2320).

ADDITIONAL NOTES & EXAMPLES

Example 1 is a system for a digital twin framework for an edge network comprising: at least one processor; and memory including instructions that, when executed by the at least one processor, cause the at least one processor to perform operations to: generate a digital twin model for physical nodes in the edge network, wherein the digital twin model includes, a digital twin for a physical node of the physical nodes, the digital twin replicating the physical node; identify an error of the physical node or the digital twin for the physical node; update the digital twin model to halt communication with the physical node or the digital twin of the physical node; and create a path to another physical node or a digital twin of the another physical node in the digital twin model.

In Example 2, the subject matter of Example 1 includes, wherein the physical nodes are discovered by a wireless broadcast messaging-based handshake protocol.

In Example 3, the subject matter of Examples 1-2 includes, the memory further comprising instructions that, when executed by the at least one processor, cause the at least one processor to perform operations to periodically update the digital twin model based on position, features, or trajectory of the physical node or the digital twin of the physical node.

In Example 4, the subject matter of Examples 1-3 includes, wherein the error is identified by an edge computing node, a second physical node, or a digital twin of the second physical node.

In Example 5, the subject matter of Examples 1-4 includes, wherein the error is identified based on receipt of degraded data from the physical node or the digital twin for the physical node, failure to receive data from the physical node or the digital twin for the physical node, or receipt of erroneous data from the physical node or the digital twin for the physical node.

In Example 6, the subject matter of Examples 1-5 includes, the memory further comprising instructions that, when executed by the at least one processor, cause the at least one processor to perform operations to: establish a coalition that includes peer physical nodes, digital twins of the peer nodes, and the physical node or the digital twin for the physical node; receive output metrics from members of the coalition; and determine that output metrics from the physical node or the digital twin for the physical node are inconsistent with output metrics from the peer physical nodes and digital twins, wherein the error is identified based on the inconsistency.

In Example 7, the subject matter of Examples 1-6 includes, wherein the digital twin model includes synchronization paths between the physical node and the digital twin and between the digital twin and another digital twin of the physical node.

In Example 8, the subject matter of Examples 1-7 includes, wherein the instructions to generate the digital twin model further comprises instructions that, when executed by the at least one processor, cause the at least one processor to perform operations to: transmit an attestation request to the physical nodes; receive attestation results from the physical nodes; create a digital twin corresponding to each physical node of the physical nodes based on the attestation results; transmit the attestation request to digital twin for each physical node of the physical nodes; receive attestation results from the digital twin for each physical node of the physical nodes; and add the physical nodes and the digital twin for each physical node of the physical nodes to the digital twin model based on the attestation results from the physical nodes and the attestation results from the digital twin for each physical node of the physical nodes.

In Example 9, the subject matter of Example 8 includes, wherein the attestation request is transmitted by a physical node of the physical nodes or a digital twin of the digital twin for each physical node.

In Example 10, the subject matter of Examples 8-9 includes, the memory further comprising instructions that, when executed by the at least one processor, cause the at least one processor to perform operations to: create an attestation appraisal policy that includes an equivalency attestation policy; receive a unique identifier and a class identifier in an attestation result from a digital twin of the digital twin; determine that an attestation policy using the unique identifier leads to an attestation failure; select the equivalency attestation policy based on the class identifier; and perform attestation of the digital twin using the equivalency attestation policy.

In Example 11, the subject matter of Example 10 includes, the memory further comprising instructions that, when executed by the at least one processor, cause the at least one processor to perform operations to: generate an environment model for the class identifier, the environment model including attestation components available to nodes of a class and dependencies of nodes of the class; and generate the equivalency attestation policy using the environment model.

In Example 12, the subject matter of Examples 10-11 includes, wherein the equivalency attestation policy includes security equivalencies that define equivalent security attestation features and environment equivalencies that define equivalent environmental attestation features.

In Example 13, the subject matter of Examples 1-12 includes, the memory further comprising instructions that, when executed by the at least one processor, cause the at least one processor to perform operations to: upon detection of the error, perform attestation of the physical node or the digital twin for the physical node using a root-of-trust; set read and write latches in memory during performance of the attestation; transfer execution of a workload to another physical node or another digital twin, wherein the digital twin model is updated with the another physical node or another digital twin; and remove the read and write latches.

In Example 14, the subject matter of Examples 1-13 includes, the memory further comprising instructions that, when executed by the at least one processor, cause the at least one processor to perform operations to discover the physical nodes in the edge network.

In Example 15, the subject matter of Examples 1-14 includes, the memory further comprising instructions that, when executed by the at least one processor, cause the at least one processor to perform operations to: determine that the physical node is missing an attestation element; identify a second physical node that includes the attestation element; and generate the digital twin for the physical node using the physical node and the second physical node.

Example 16 is at least one non-transitory machine-readable memory including instructions for a digital twin framework for an edge network that, when executed by at least one processor, cause the at least one processor to perform operations to: generate a digital twin model for physical nodes in the edge network, wherein the digital twin model includes, a digital twin for a physical node of the physical nodes, the digital twin replicating the physical node; identify an error of the physical node or the digital twin for the physical node; update the digital twin model to halt communication with the physical node or the digital twin of the physical node; and create a path to another physical node or a digital twin of the another physical node in the digital twin model.

In Example 17, the subject matter of Example 16 includes, wherein the physical nodes are discovered by a wireless broadcast messaging-based handshake protocol.

In Example 18, the subject matter of Examples 16-17 includes, instructions that, when executed by the at least one processor, cause the at least one processor to perform operations to periodically update the digital twin model based on position, features, or trajectory of the physical node or the digital twin of the physical node.

In Example 19, the subject matter of Examples 16-18 includes, wherein the error is identified by an edge computing node, a second physical node, or a digital twin of the second physical node.

In Example 20, the subject matter of Examples 16-19 includes, wherein the error is identified based on receipt of degraded data from the physical node or the digital twin for the physical node, failure to receive data from the physical node or the digital twin for the physical node, or receipt of erroneous data from the physical node or the digital twin for the physical node.

In Example 21, the subject matter of Examples 16-20 includes, instructions that, when executed by the at least one processor, cause the at least one processor to perform operations to: establish a coalition that includes peer physical nodes, digital twins of the peer nodes, and the physical node or the digital twin for the physical node; receive output metrics from members of the coalition; and determine that output metrics from the physical node or the digital twin for the physical node are inconsistent with output metrics from the peer physical nodes and digital twins, wherein the error is identified based on the inconsistency.

In Example 22, the subject matter of Examples 16-21 includes, wherein the digital twin model includes synchronization paths between the physical node and the digital twin and between the digital twin and another digital twin of the physical node.

In Example 23, the subject matter of Examples 16-22 includes, wherein the instructions to generate the digital twin model further comprises instructions that, when executed by the at least one processor, cause the at least one processor to perform operations to: transmit an attestation request to the physical nodes; receive attestation results from the physical nodes; create a digital twin corresponding to each physical node of the physical nodes based on the attestation results; transmit the attestation request to the digital twin for each physical node of the physical nodes; receive attestation results from the digital twin for each physical node of the physical nodes; and add the physical nodes and the digital twin for each physical node of the physical nodes to the digital twin model based on the attestation results from the physical nodes and the attestation results from the digital twin for each physical node of the physical nodes.

In Example 24, the subject matter of Example 23 includes, wherein the attestation request is transmitted by a physical node of the physical nodes or a digital twin of the digital twin for each physical node.

In Example 25, the subject matter of Examples 23-24 includes, instructions that, when executed by the at least one processor, cause the at least one processor to perform operations to: create an attestation appraisal policy that includes an equivalency attestation policy; receive a unique identifier and a class identifier in an attestation result from a digital twin of the digital twin; determine that an attestation policy using the unique identifier leads to an attestation failure; select the equivalency attestation policy based on the class identifier; and perform attestation of the digital twin using the equivalency attestation policy.

In Example 26, the subject matter of Example 25 includes, instructions that, when executed by the at least one processor, cause the at least one processor to perform operations to: generate an environment model for the class identifier, the environment model including attestation components available to nodes of a class and dependencies of nodes of the class; and generate the equivalency attestation policy using the environment model.

In Example 27, the subject matter of Examples 25-26 includes, wherein the equivalency attestation policy includes security equivalencies that define equivalent security attestation features and environment equivalencies that define equivalent environmental attestation features.

In Example 28, the subject matter of Examples 16-27 includes, instructions that, when executed by the at least one processor, cause the at least one processor to perform operations to: upon detection of the error, perform attestation of the physical node or the digital twin for the physical node using a root-of-trust; set read and write latches in memory during performance of the attestation; transfer execution of a workload to another physical node or another digital twin, wherein the digital twin model is updated with the another physical node or another digital twin; and remove the read and write latches.

In Example 29, the subject matter of Examples 16-28 includes, instructions that, when executed by the at least one processor, cause the at least one processor to perform operations to discover the physical nodes in the edge network.

In Example 30, the subject matter of Examples 16-29 includes, instructions that, when executed by the at least one processor, cause the at least one processor to perform operations to: determine that the physical node is missing an attestation element; identify a second physical node that includes the attestation element; and generate the digital twin for the physical node using the physical node and the second physical node.

Example 31 is a method for a digital twin framework for an edge network comprising: generating a digital twin model for physical nodes in the edge network, wherein the digital twin model includes, a digital twin for a physical node of the physical nodes, the digital twin replicating the physical node; identifying an error of the physical node or the digital twin for the physical node; updating the digital twin model to halt communication with the physical node or the digital twin of the physical node; and creating a path to another physical node or a digital twin of the another physical node in the digital twin model.

In Example 32, the subject matter of Example 31 includes, wherein the physical nodes are discovered by a wireless broadcast messaging-based handshake protocol.

In Example 33, the subject matter of Examples 31-32 includes, periodically updating the digital twin model based on position, features, or trajectory of the physical node or the digital twin of the physical node.

In Example 34, the subject matter of Examples 31-33 includes, wherein the error is identified by an edge computing node, a second physical node, or a digital twin of the second physical node.

In Example 35, the subject matter of Examples 31-34 includes, wherein the error is identified based on receipt of degraded data from the physical node or the digital twin for the physical node, failure to receive data from the physical node or the digital twin for the physical node, or receipt of erroneous data from the physical node or the digital twin for the physical node.

In Example 36, the subject matter of Examples 31-35 includes, establishing a coalition that includes peer physical nodes, digital twins of the peer nodes, and the physical node or the digital twin for the physical node; receiving output metrics from members of the coalition; and determining that output metrics from the physical node or the digital twin for the physical node are inconsistent with output metrics from the peer physical nodes and digital twins, wherein the error is identified based on the inconsistency.

In Example 37, the subject matter of Examples 31-36 includes, wherein the digital twin model includes synchronization paths between the physical node and the digital twin and between the digital twin and another digital twin of the physical node.

In Example 38, the subject matter of Examples 31-37 includes, wherein generating the digital twin model further comprises: transmitting an attestation request to the physical nodes; receiving attestation results from the physical nodes; creating a digital twin corresponding to each physical node of the physical nodes based on the attestation results; transmitting the attestation request to the digital twin for each physical node of the physical nodes; receiving attestation results from the digital twin for each physical node of the physical nodes; and adding the physical nodes and the digital twin for each physical node of the physical nodes to the digital twin model based on the attestation results from the physical nodes and the attestation results from the digital twin for each physical node of the physical nodes.

In Example 39, the subject matter of Example 38 includes, wherein the attestation request is transmitted by a physical node of the physical nodes or a digital twin of the digital twin for each physical node.

In Example 40, the subject matter of Examples 38-39 includes, creating an attestation appraisal policy that includes an equivalency attestation policy; receiving a unique identifier and a class identifier in an attestation result from a digital twin of the digital twin; determining that an attestation policy using the unique identifier leads to an attestation failure; selecting the equivalency attestation policy based on the class identifier; and performing attestation of the digital twin using the equivalency attestation policy.

In Example 41, the subject matter of Example 40 includes, generating an environment model for the class identifier, the environment model including attestation components available to nodes of a class and dependencies of nodes of the class; and generating the equivalency attestation policy using the environment model.

In Example 42, the subject matter of Examples 40-41 includes, wherein the equivalency attestation policy includes security equivalencies that define equivalent security attestation features and environment equivalencies that define equivalent environmental attestation features.

In Example 43, the subject matter of Examples 31-42 includes, upon detection of the error, performing attestation of the physical node or the digital twin for the physical node using a root-of-trust; setting read and write latches in memory during performance of the attestation; transferring execution of a workload to another physical node or another digital twin, wherein the digital twin model is updated with the another physical node or another digital twin; and removing the read and write latches.

In Example 44, the subject matter of Examples 31-43 includes, discovering the physical nodes in the edge network.

In Example 45, the subject matter of Examples 31-44 includes, determining that the physical node is missing an attestation element; identifying a second physical node that includes the attestation element; and generating the digital twin for the physical node using the physical node and the second physical node.

Example 46 is at least one machine-readable medium including instructions that, when executed by a machine, cause the machine to perform any method of Examples 31-45.

Example 47 is a system comprising means to perform any method of Examples 31-45.

Example 48 is a system for a digital twin framework for an edge network comprising: means for generating a digital twin model for physical nodes in the edge network, wherein the digital twin model includes, a digital twin for a physical node of the physical nodes, the digital twin replicating the physical node; means for identifying an error of the physical node or the digital twin for the physical node; means for updating the digital twin model to halt communication with the physical node or the digital twin of the physical node; and means for creating a path to another physical node or a digital twin of the another physical node in the digital twin model.

In Example 49, the subject matter of Example 48 includes, wherein the physical nodes are discovered by a wireless broadcast messaging-based handshake protocol.

In Example 50, the subject matter of Examples 48-49 includes, means for periodically updating the digital twin model based on position, features, or trajectory of the physical node or the digital twin of the physical node.

In Example 51, the subject matter of Examples 48-50 includes, wherein the error is identified by an edge computing node, a second physical node, or a digital twin of the second physical node.

In Example 52, the subject matter of Examples 48-51 includes, wherein the error is identified based on receipt of degraded data from the physical node or the digital twin for the physical node, failure to receive data from the physical node or the digital twin for the physical node, or receipt of erroneous data from the physical node or the digital twin for the physical node.

In Example 53, the subject matter of Examples 48-52 includes, means for establishing a coalition that includes peer physical nodes, digital twins of the peer nodes, and the physical node or the digital twin for the physical node; means for receiving output metrics from members of the coalition; and means for determining that output metrics from the physical node or the digital twin for the physical node are inconsistent with output metrics from the peer physical nodes and digital twins, wherein the error is identified based on the inconsistency.

In Example 54, the subject matter of Examples 48-53 includes, wherein the digital twin model includes synchronization paths between the physical node and the digital twin and between the digital twin and another digital twin of the physical node.

In Example 55, the subject matter of Examples 48-54 includes, wherein the means for generating the digital twin model further comprises: means for transmitting an attestation request to the physical nodes; means for receiving attestation results from the physical nodes; means for creating a digital twin corresponding to each physical node of the physical nodes based on the attestation results; means for transmitting the attestation request to the digital twin for each physical node of the physical nodes; means for receiving attestation results from the digital twin for each physical node of the physical nodes; and means for adding the physical nodes and the digital twin for each physical node of the physical nodes to the digital twin model based on the attestation results from the physical nodes and the attestation results from the digital twin for each physical node of the physical nodes.

In Example 56, the subject matter of Example 55 includes, wherein the attestation request is transmitted by a physical node of the physical nodes or a digital twin of the digital twin for each physical node.

In Example 57, the subject matter of Examples 55-56 includes, means for creating an attestation appraisal policy that includes an equivalency attestation policy; means for receiving a unique identifier and a class identifier in an attestation result from a digital twin of the digital twin; means for determining that an attestation policy using the unique identifier leads to an attestation failure; means for selecting the equivalency attestation policy based on the class identifier; and means for performing attestation of the digital twin using the equivalency attestation policy.

In Example 58, the subject matter of Example 57 includes, means for generating an environment model for the class identifier, the environment model including attestation components available to nodes of a class and dependencies of nodes of the class; and means for generating the equivalency attestation policy using the environment model.

In Example 59, the subject matter of Examples 57-58 includes, wherein the equivalency attestation policy includes security equivalencies that define equivalent security attestation features and environment equivalencies that define equivalent environmental attestation features.

In Example 60, the subject matter of Examples 48-59 includes, means for performing attestation of the physical node or the digital twin for the physical node using a root-of-trust upon detection of the error; means for setting read and write latches in memory during performance of the attestation; means for transferring execution of a workload to another physical node or another digital twin, wherein the digital twin model is updated with the another physical node or another digital twin; and means for removing the read and write latches.

In Example 61, the subject matter of Examples 48-60 includes, means for discovering the physical nodes in the edge network.

In Example 62, the subject matter of Examples 48-61 includes, means for determining that the physical node is missing an attestation element; means for identifying a second physical node that includes the attestation element; and means for generating the digital twin for the physical node using the physical node and the second physical node.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

Example 67 is an apparatus comprising means for performing any of the operations of Examples 1-62.

Example 68 is a system to perform the operations of any of the Examples 1-62.

Example 69 is a method to perform the operations of any of the Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for a digital twin framework for an edge network comprising:
at least one processor; and
memory including instructions that, when executed by the at least one processor, cause the at least one processor to perform operations to:
generate a digital twin model for physical nodes in the edge network, wherein the digital twin model includes a digital twin for a physical node of the physical nodes, the digital twin replicating the physical node;
establish a coalition that includes peer physical nodes, digital twins of the peer physical nodes, and the physical node or the digital twin for the physical node;
receive output metrics from members of the coalition; and
determine that output metrics from the physical node or the digital twin for the physical node are inconsistent with output metrics from the peer physical nodes and digital twins;
identify an error of the physical node or the digital twin for the physical node based in part on the inconsistency;
update the digital twin model to halt communication with the physical node or the digital twin of the physical node; and
create a path to another physical node or a digital twin of the another physical node in the digital twin model.

2. The system of claim 1, wherein the physical nodes are discovered by a wireless broadcast messaging-based handshake protocol.

3. The system of claim 1, the memory further comprising instructions that, when executed by the at least one processor, cause the at least one processor to perform operations to periodically update the digital twin model based on position, features, or trajectory of the physical node or the digital twin of the physical node.

4. The system of claim 1, wherein the error is identified by an edge computing node, a second physical node, or a digital twin of the second physical node.

5. The system of claim 1, wherein the error is identified based in part on receipt of degraded data from the physical node or the digital twin for the physical node, failure to receive data from the physical node or the digital twin for the physical node, or receipt of erroneous data from the physical node or the digital twin for the physical node.

6. The system of claim 1, wherein the digital twin model includes synchronization paths between the physical node and the digital twin replicating the physical node and between the digital twin replicating the physical node and another digital twin of the physical node.

7. The system of claim 1, wherein the instructions to generate the digital twin model further comprises instructions that, when executed by the at least one processor, cause the at least one processor to perform operations to:
transmit an attestation request to the physical nodes;
receive attestation results from the physical nodes;
create a digital twin corresponding to each physical node of the physical nodes based on the attestation results;
transmit the attestation request to digital twin for each physical node of the physical nodes;
receive attestation results from the digital twin for each physical node of the physical nodes; and
add the physical nodes and the digital twin for each physical node of the physical nodes to the digital twin model based on the attestation results from the physical nodes and the attestation results from the digital twin for each physical node of the physical nodes.

8. The system of claim 7, wherein the attestation request is transmitted by a physical node of the physical nodes or a digital twin of the digital twin for each physical node.

9. The system of claim 7, the memory further comprising instructions that, when executed by the at least one processor, cause the at least one processor to perform operations to:
create an attestation appraisal policy that includes an equivalency attestation policy;
receive a unique identifier and a class identifier in an attestation result from a digital twin of the digital twin;
determine that an attestation policy using the unique identifier leads to an attestation failure;
select the equivalency attestation policy based on the class identifier; and
perform attestation of the digital twin using the equivalency attestation policy.

10. The system of claim 9, the memory further comprising instructions that, when executed by the at least one processor, cause the at least one processor to perform operations to:

generate an environment model for the class identifier, the environment model including attestation components available to nodes of a class and dependencies of nodes of the class; and generate the equivalency attestation policy using the environment model.

11. The system of claim 9, wherein the equivalency attestation policy includes security equivalencies that define equivalent security attestation features and environment equivalencies that define equivalent environmental attestation features.

12. The system of claim 1, the memory further comprising instructions that, when executed by the at least one processor, cause the at least one processor to perform operations to:

upon detection of the error, perform attestation of the physical node or the digital twin for the physical node using a root-of-trust;

set read and write latches in memory during performance of the attestation;

transfer execution of a workload to another physical node or another digital twin, wherein the digital twin model is updated with the another physical node or another digital twin; and remove the read and write latches.

13. The system of claim 1, the memory further comprising instructions that, when executed by the at least one processor, cause the at least one processor to perform operations to discover the physical nodes in the edge network.

14. At least one non-transitory machine-readable memory including instructions for a digital twin framework for an edge network that, when executed by at least one processor, cause the at least one processor to perform operations to:

generate a digital twin model for physical nodes in the edge network, wherein the digital twin model includes a digital twin for a physical node of the physical nodes, the digital twin replicating the physical node;

establish a coalition that includes peer physical nodes, digital twins of the peer physical nodes, and the physical node or the digital twin for the physical node;

receive output metrics from members of the coalition; and determine that output metrics from the physical node or the digital twin for the physical node are inconsistent with output metrics from the peer physical nodes and digital twins;

identify an error of the physical node or the digital twin for the physical node based in part on the inconsistency;

update the digital twin model to halt communication with the physical node or the digital twin of the physical node; and create a path to another physical node or a digital twin of the another physical node in the digital twin model.

15. The at least one non-transitory machine-readable memory of claim 14, wherein the physical nodes are discovered by a wireless broadcast messaging-based handshake protocol.

16. The at least one non-transitory machine-readable memory of claim 14, further comprising instructions that, when executed by the at least one processor, cause the at least one processor to perform operations to periodically update the digital twin model based on position, features, or trajectory of the physical node or the digital twin of the physical node.

17. The at least one non-transitory machine-readable memory of claim 14, wherein the error is identified by an edge computing node, a second physical node, or a digital twin of the second physical node.

18. The at least one non-transitory machine-readable memory of claim 14, wherein the error is identified in part based on receipt of degraded data from the physical node or the digital twin for the physical node, failure to receive data from the physical node or the digital twin for the physical node, or receipt of erroneous data from the physical node or the digital twin for the physical node.

19. The at least one non-transitory machine-readable memory of claim 14, wherein the digital twin model includes synchronization paths between the physical node and the digital twin replicating the physical node and between the digital twin replicating the physical node and another digital twin of the physical node.

20. The at least one non-transitory machine-readable memory of claim 14, wherein the instructions to generate the digital twin model further comprises instructions that, when executed by the at least one processor, cause the at least one processor to perform operations to:

transmit an attestation request to the physical nodes;

receive attestation results from the physical nodes;

create a digital twin corresponding to each physical node of the physical nodes based on the attestation results;

transmit the attestation request to the digital twin for each physical node of the physical nodes;

receive attestation results from the digital twin for each physical node of the physical nodes; and add the physical nodes and the digital twin for each physical node of the physical nodes to the digital twin model based on the attestation results from the physical nodes and the attestation results from the digital twin for each physical node of the physical nodes.

21. The at least one non-transitory machine-readable memory of claim 20, wherein the attestation request is transmitted by a physical node of the physical nodes or a digital twin of the digital twin for each physical node.

22. The at least one non-transitory machine-readable memory of claim 20, further comprising instructions that, when executed by the at least one processor, cause the at least one processor to perform operations to:

create an attestation appraisal policy that includes an equivalency attestation policy;

receive a unique identifier and a class identifier in an attestation result from a digital twin of the digital twin;

determine that an attestation policy using the unique identifier leads to an attestation failure;

select the equivalency attestation policy based on the class identifier; and perform attestation of the digital twin using the equivalency attestation policy.

23. The at least one non-transitory machine-readable memory of claim 22, further comprising instructions that, when executed by the at least one processor, cause the at least one processor to perform operations to:

generate an environment model for the class identifier, the environment model including attestation components available to nodes of a class and dependencies of nodes of the class; and generate the equivalency attestation policy using the environment model.

* * * * *